US007752545B2

(12) United States Patent
Phillips, II et al.

(10) Patent No.: US 7,752,545 B2
(45) Date of Patent: Jul. 6, 2010

(54) GENERATOR SYSTEM

(75) Inventors: Howard William Phillips, II, Woodinville, WA (US); Michel Pahud, Kirkland, WA (US); Margaret Johnson, Kirkland, WA (US); Heinz Wilfried Schuller, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/376,662

(22) Filed: Mar. 15, 2006

(65) Prior Publication Data

US 2007/0220018 A1 Sep. 20, 2007

(51) Int. Cl.
G06F 3/00 (2006.01)
(52) U.S. Cl. .................................... 715/709; 715/708
(58) Field of Classification Search ............... 715/708, 715/709; 717/47, 57; 714/47, 48, 57
See application file for complete search history.

(56) References Cited

U.S. PATENT DOCUMENTS

| | | | |
|---|---|---|---|
| 5,018,082 A * | 5/1991 | Obata et al. ................. 715/707 |
| 5,188,363 A | 2/1993 | Marnell, II et al. |
| 6,021,403 A | 2/2000 | Horvitz et al. |
| 6,446,203 B1 | 9/2002 | Aguilar et al. |
| 6,718,490 B1 * | 4/2004 | Takemoto et al. ............. 714/47 |
| 6,971,108 B1 | 11/2005 | Clark et al. |
| 2001/0052910 A1 | 12/2001 | Parekh et al. |
| 2004/0242305 A1 | 12/2004 | Baerlocher |
| 2005/0027504 A1 * | 2/2005 | Watanabe ..................... 703/22 |
| 2005/0073594 A1 | 4/2005 | Tagawa |
| 2005/0085298 A1 | 4/2005 | Woolston |
| 2006/0284021 A1 * | 12/2006 | A'Harrah ..................... 244/195 |
| 2007/0283266 A1 * | 12/2007 | Bodin et al. ................. 715/707 |

FOREIGN PATENT DOCUMENTS

EP 0582536 2/1994

OTHER PUBLICATIONS

Ye, Zhan, "Genres as a Tool for Understanding and Analyzing User Experience in Games", CHI 2004, Apr. 2004.
Ovcharenko et al., "Mulan: Multiple-sequence local alignment and visualization for studying function and evolution", Genome Research, Dec. 2004.

* cited by examiner

*Primary Examiner*—Dennis Bonshock

(57) ABSTRACT

A generator sequence is defined and used for providing an enhanced user experience and increased user control. A generator sequence is established as a series of user inputs that trigger an output. User inputs to the generator system managing the generator sequence are employed to define a user performance value for a specific point, or position, in the generator sequence. The user performance value is then used to establish a new user point, or position, in the generator sequence. The user inputs and/or the new user generator sequence point are used to identify one or more feedback effects files and/or functions and one or more benefit effects files and/or functions for producing user output. A user can utilize the feedback effects and/or benefit effects to alter their inputs to control the generator sequence.

20 Claims, 19 Drawing Sheets

GENERATOR SEQUENCE

GENERATOR SEQUENCE

| SEQUENCE POINT | GRAPHIC EFFECTS | AUDIO EFFECTS | BENEFITS |
|---|---|---|---|
| INITIAL INPUT | START.PNG 981 | START.WAV 982 | <KP() = "1"> |
| STAGE 25% | SEQ25.PNG | SEQ25.WAV | <KP() = "2"> |
| STAGE 50% | SEQ50.PNG | SEQ50.WAV | <KP() = "2"> |
| STAGE 75% | SEQ75.PNG | SEQ75.WAV | <KP() = "3"> |
| FINAL OUTCOME | FINAL.PNG 983 | FINAL.WAV 984 | <KP() = "4"> |
| CONSOLATION | BAIL.PNG 986 | BAIL.WAV 987 | <KP() = "1"> |

GENERATOR SYSTEM

BACKGROUND

On today's computers, user inputs are optimized for efficient task completion. The point and click operation, e.g., with a computer mouse, is a common method recognized by and integrated into a vast variety of computer programs accessed by today's computer users. However, when the goal of a computer platform activity is to provide a pleasurable, skill developmental, educational and/or more user meaningful experience the discrete nature of current input handling software lacks the required granularity and feedback sophistication to necessarily achieve these ends.

For example, if a computer-supported learning experience involves activating a graphic beehive to cause bees to emerge and swarm about, a point and click operation on the beehive, while it can satisfy the goal of activating bees, will not create an interactive, pleasurable, or even very meaningful experience. Users can quickly get bored with this nominal interaction, which, while efficient, lacks any sustained user interplay. User boredom can likely translate into unused computer software which fails in its designed mission to educate.

As another example, a computer program using the well known point and click input activity can be created to ostensibly help computer users choose a paint color for their home walls. With the number of paint colors accessible to a user likely very large, this well-known type of input activity can leave the user overwhelmed and ultimately frustrated. Using the point and click methodology, the computer program will potentially require the user to pick a plethora of discrete choices in their attempt to find their perfect color shade. The user's frustration can grow with no means to use their prior choices to help target the actual desired color.

A multitude of other computer programs, including, but not limited to, educational, shopping, game playing, and activity-oriented (e.g., word processing, spreadsheets, etc.), can also suffer from less user-engaging or meaningful user experiences.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include technology that provides for increased user control over their interaction with computer programs by supplying users input feedback and performance benefits. Embodiments also discussed herein include technology that supports users enacting seemingly real life activities to enhance the enjoyment and meaningfulness of their computer interaction. Embodiments discussed herein also, or alternatively, include technology for supporting educational activities and/or skill developmental undertakings.

In an embodiment, a generator system is implemented to increase the ultimate usefulness of a computer program experience. An input process for a particular computer user activity is defined as a sequence of inputs that ultimately trigger an output, i.e., a generator sequence. User inputs are used to generate performance values that are employed in determining a user's progression, or regression, in the generator sequence. In an aspect of an embodiment, input feedback, in what users perceive as real-time, creates a user illusion of a direct physical connection with the content being output to them as they interact with the computer program. In some embodiments, the input feedback also facilitates greater user control over the generator sequence as users can adjust their inputs based on the perceptible changes in the input feedback and/or the rate of change of the input feedback.

In an aspect of an embodiment, curves are created for user input feedback, generator sequence difficulty and sequence benefit. In an embodiment, user input feedback curves are designed to deliver an initial quick spike in magnitude of feedback, to get a user interested and involved, with diminishing increases in magnitude over time. In an embodiment, the generator sequence difficulty curve is ramped to appropriately increase user performance demands as the generator sequence progresses. In an embodiment, the sequence benefit curve is established in order that a user is provided a modest initial return of benefit for effort, with a rapid magnitude increase as the generator sequence nears its end.

BRIEF DESCRIPTION OF THE DRAWINGS

These and other features will now be described with reference to the drawings of certain embodiments and examples, which are intended to illustrate and not to limit the invention, and in which.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention. The titles used throughout are for ease of explanation only, and are not for use in limiting the invention.

Generator System

Figure 1:
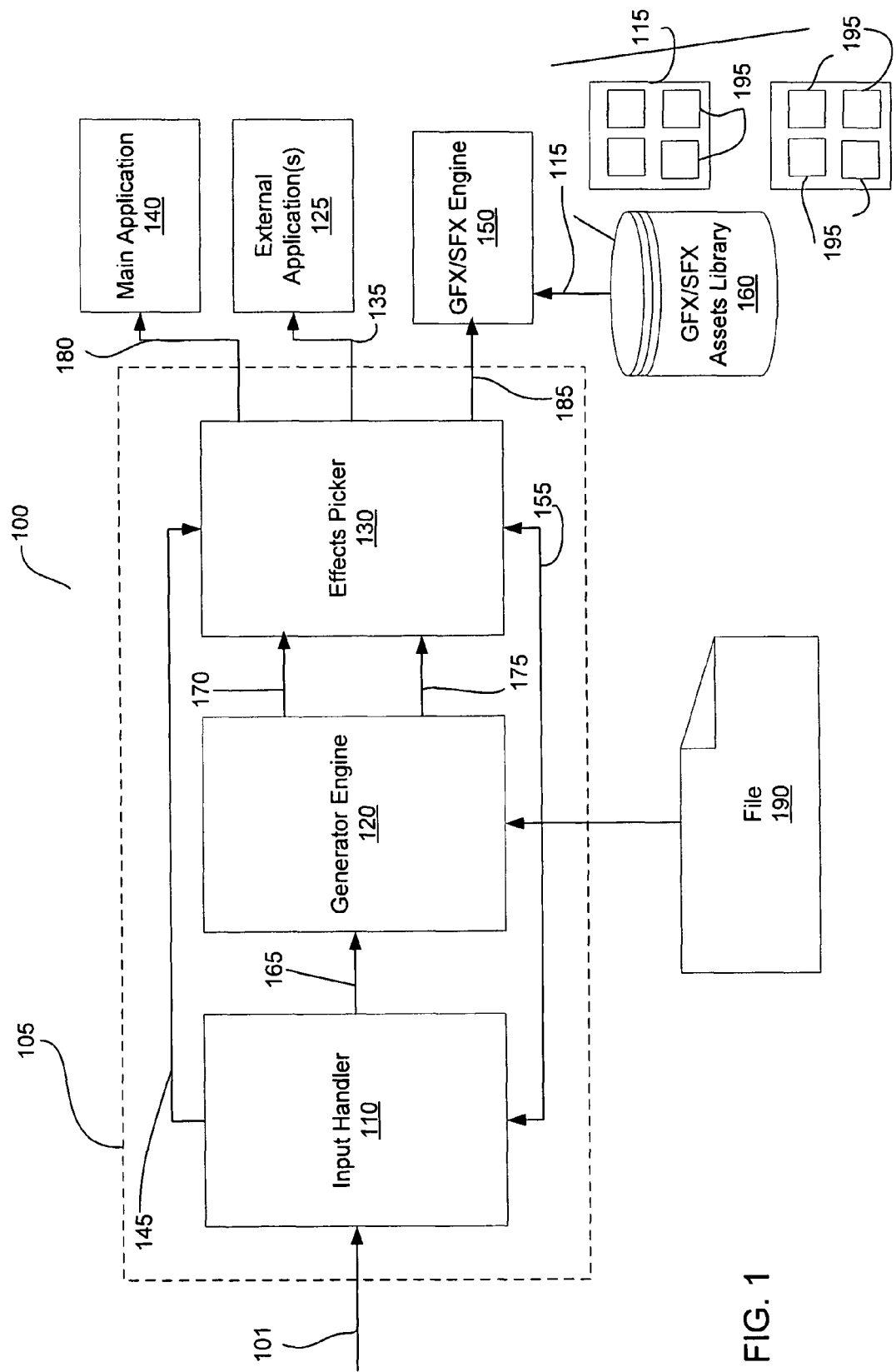
FIG. 1 is an embodiment generator system.

An embodiment generator system 100, depicted in FIG. 1, is a flexible system suitable for use with a wide variety of input scenarios, tasks, and desired outputs. In an embodiment, the generator system 100, implemented in software and/or hardware, parameterizes a user input sequence to provide an engaging and meaningful interaction for the user. In an embodiment, the generator system 100 parameterizes a user input sequence to also, or alternatively, facilitate increased user control.

In an embodiment the generator system 100 uses a generator sequence which is the process of supplying input feedback, also referred to herein as feedback, and sequence benefit, also referred to herein as benefit, output for a sequence of user inputs that ultimately trigger an application output. In an embodiment, a generator sequence is a continuum, i.e., an uninterrupted ordered sequence that defines a path from the beginning of an application, or some subset of an application, e.g., an application activity, to the end of the application, or some subset of the application. In an embodiment, a user that accesses the generator sequence is at a point, or position, in the generator sequence at any one time. The user changes points, or positions, in the generator sequence based on, e.g., their inputs to the generator system 100.

In an embodiment, a generator sequence may, alternatively, be a series of ordered discrete points that fix a path from the beginning of an application, or some subset of an application, to the end of the application, or some subset of the application. In an embodiment, a user that accesses the generator sequence is at a discrete point, or position, in the generator sequence at any one time. The user changes discrete points, or positions, in the generator sequence based on, e.g., their inputs to the generator system 100.

A user's current generator sequence point, or position, determines the feedback effects, e.g., graphic and/or audio output, and sequence benefit effects, e.g., graphic and/or audio output, provided a user at any particular time in the generator sequence.

In an embodiment, in general, feedback effects provide a user feedback on how well they are doing in a particular generator sequence. In some embodiments, however, a generator sequence has no right or wrong path for a user to traverse, e.g., a generator sequence for picking a home wall color. In these alternative embodiments, feedback effects can be designed to help facilitate the user's goal in using the generator sequence, e.g., designed to help a user target their particular desired color shade.

In an embodiment a generator sequence can be defined with one or more feedback elements. For example, a generator sequence for a user to learn to trace a letter can have an accuracy feedback element and a speed feedback element. One or more effects files, e.g., audio and/or graphics files, and/or functions for producing an output effect can be assigned to each of various feedback values for each of these feedback, speed and accuracy, elements. The assigned effects file(s) and/or function(s) provide a user feedback during the generator sequence on both the speed of their efforts to trace the designated letter and their accuracy in tracing the designated letter.

In an embodiment, in general, sequence benefit effects provide a user benefit as they move within a generator sequence. In an embodiment, one or more effects files and/or functions are assigned to each of various benefit values. The assigned effects file(s) and/or function(s) provide sequence benefit, e.g., audio and/or graphics output, to a user that indicates, or is otherwise associated with, achievement of the goal of the generator sequence, as the user progresses through the generator sequence.

In an embodiment the generator system 100 creates a user illusion of a direct physical connection with the outputs supplied the user, e.g., the graphics displayed on the user's display device and the audio output via the user's audio device. In an embodiment, the illusion of a direct physical connection is generated by combining conceptual models of interaction with granular input and perceived real time user feedback.

In an embodiment the generator system 100 employs overt structures that reflect conceptual models of interaction that align with real world user experiences. For example, in an embodiment, one such overt structure is shaking, which is generated by a user making rapid back and forth movements with a pointing device, such as, but not limited to, a computer stylus. Other embodiment overt structures can include, but are not limited to, stroking, petting, strumming, flicking, tracing, pecking, whacking, drumming, batting, talking, singing, whispering, shouting, blowing, dodging, hugging, circling, whipping, winding, dragging, uncovering, and plugging.

In an embodiment the generator system 100 also employs covert mechanisms that procedurally process and link user inputs to feedback and sequence benefit output, and the resultant application output. These covert mechanisms establish and constrain the relationships between the user's inputs, feedback and sequence benefit output, and the resultant application output to maintain the dynamics of the generator sequence.

The generator system 100 is used by various interaction designers to create specific generator instances, each tailored for a particular functionality, including but not limited to, educational (e.g., teaching a skill, such as learning to trace or write a letter, etc.), reading, task-oriented (e.g., word processing, spread-sheet creation and analysis, etc.), shopping, etc.

Generator

In an embodiment the generator system 100 has a generator 105 which contains an input handler 110, a generator engine 120 and an effects picker 130. In an embodiment, the input handler 110, the generator engine 120 and the effects picker 130 are separate software applications and/or hardware components. In an alternative embodiment, the input handler 110, the generator engine 120 and the effects picker 130 are each an individual software and/or hardware module, or module collections, of one generator 105 application. In still another alternative embodiment, the input handler 110, the generator engine 120 and the effects picker 130 are simply the various functions (defined in software and/or hardware) of the generator 105.

In an embodiment the generator 105 defines a generator sequence for an application, or subset of an application. In defining a generator sequence, the generator 105 establishes a sequence of user inputs to trigger a resultant application output. In an embodiment the sequence of inputs facilitates user engagement by supplying a time element to the inputs, as well as the possibility of varied inputs and output over time. A sequence of inputs also provides variability that promotes increased user control by affording a user an opportunity to input a greater amount of data which can be used to deliver a wider output variety and/or greater output granularity.

In an embodiment the generator 105 receives inputs 101 from any known, or any combination of any known, computer input device, such as, but not limited to, a computer mouse, a computer stylus, a keyboard, a graphics display touch screen, a joy stick, a microphone and a camera. In an embodiment the generator 105 uses the input data 101 to update the user's progress in the generator sequence. The generator 105 also uses the input data 101 to select content sets 115 and specific content pieces 195 of the selected content sets 115, e.g., graphic and/or audio files, and/or functions, stored in the GFX/SFX assets library 160 for output to the user.

In an embodiment a content set 115 has one or more content pieces 195 which themselves are one or more graphic and/or audio files, and/or functions, for creating user output. The GFX/SFX engine 150 outputs selected content piece(s) 195 to a user, thereby providing a user feedback and sequence benefit effects.

In an embodiment the generator 105 is parameterized to allow interaction designers to create specific generator instances for applications or subsets of applications. In an embodiment, the interaction designers' control over generator parameters is limited to preserve the nature of the relationships between user inputs, feedback and sequence benefit, and the resultant application output required for maintaining the generator sequence dynamics.

In an embodiment the input handler 110 of the generator 105 receives data 101 from one or more input devices, processes the input data 101 for the generator's use, and provides, or otherwise makes available, data 145 to the effects picker 130 and data 165 to the generator engine 120.

In an embodiment the generator engine 120 of the generator 105 defines the generator sequence and, with the data 165 received from the input handler 110, progresses the user through the generator sequence. In an embodiment the generator engine 120 also further processes the data 165 obtained from the input handler 110 and produces data 170 and data 175 for use by the effects picker 130.

In an embodiment the effects picker 130 of the generator 105 uses data obtained from the input handler 110, i.e., data 145, and the generator engine 120, i.e., data 170 and 175, to generate data 185. The data 185 is used by the GFX/SFX engine 150 to select content sets 115 and specific content pieces 195 of the selected content sets 115, e.g., graphic and/or audio files, and/or functions, stored in the GFX/SFX assets library 160 for output to the user.

In an embodiment the effects picker 130 also outputs data 135 to one or more external applications 125, e.g., a software renderer, a particle effects generator, etc. The output data 135 can consist of effects picker derived data, input data and/or other generator derived data. The external applications 125 can be integrated by an interaction designer with the generator 105 to complement the content sets 115 used to provide user output. In an embodiment the external applications 125 can alternatively be used to independently generate the desired user output.

In an embodiment the effects picker 130 can also output data 180 to a main application 140, e.g., game application data 180 for a main game application, or engine, 140. For example, the computer generator system 100 can be used with a game engine to enhance the sophistication, granularity, etc., of the outputs provided a gaming user. In this example, the effects picker 130 outputs, or otherwise makes available, to the game engine 140 data 180 which can include effects picker derived data, input data and/or other generator derived data.

Generator Data

Data 155, stored in a file 190, is used by the generator 105 to tell the generator components, i.e., the input handler 110, the generator engine 120 and the effects picker 130, how to adapt their basic processes to deliver the user experience intended by the interaction designer.

In an embodiment the file 190 is an xml (Extensible Markup Language) file. In alternative embodiments the file 190 is in other data file formats. Data 155 in the file 190 can be authored by an interaction designer to tailor the computer generator system 100 to a specific generator instance, or application. In an embodiment, to create a generator instance an interaction designer can make modifications to the generator 105, via the file 190, by filling in one or more templates. In an embodiment, an interaction designer can also, or alternatively, make modifications to the generator 105 by changing specific data values in the file 190.

In an embodiment the data 155 can also, or alternatively, consist of pre-established default values, procedurally generated values and/or values provided by a main application 140 and/or one or more external applications 125.

Figure 2:
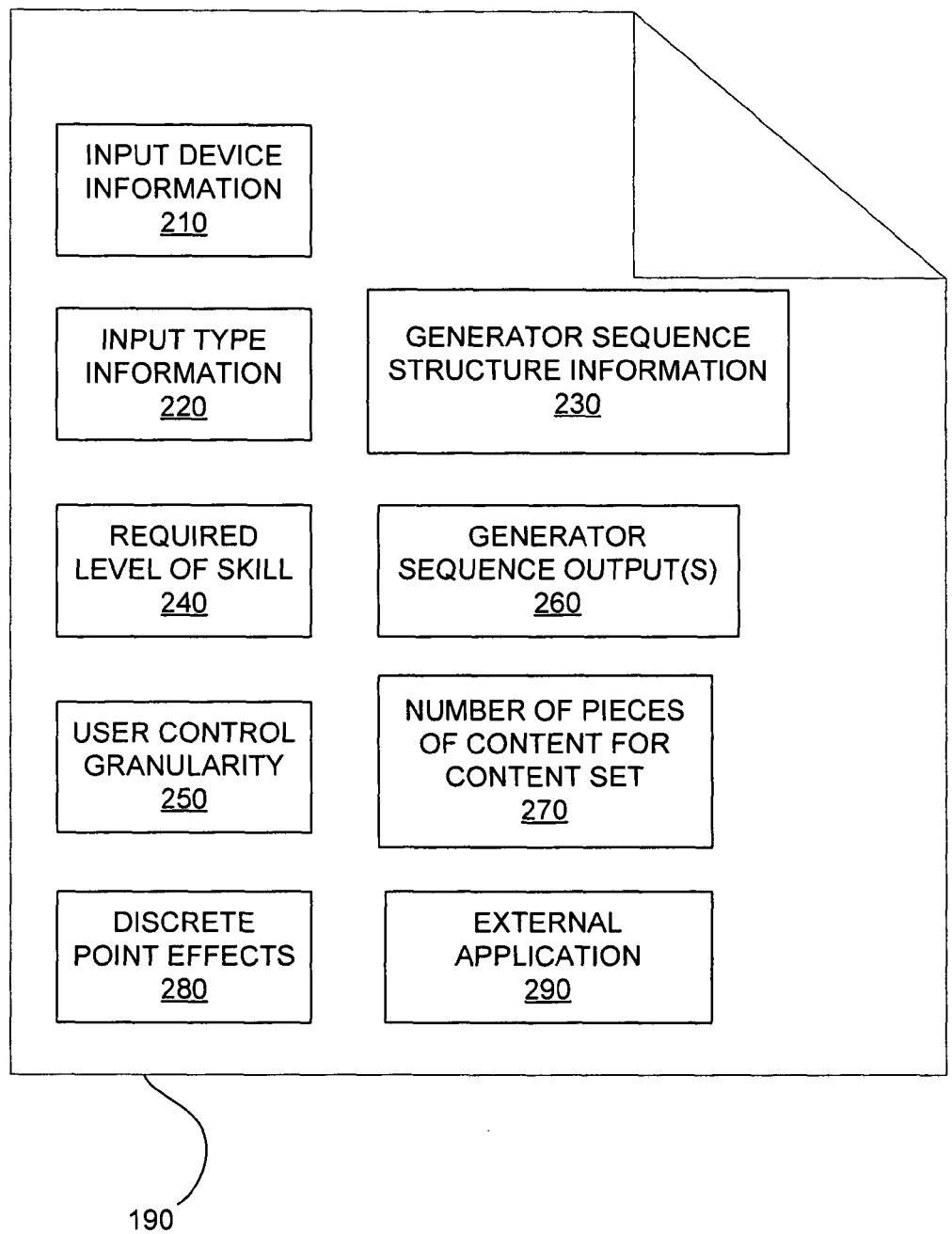
FIG. 2 depicts data information stored in an embodiment generator system file for use in executing a generator sequence.

In an embodiment, data 155 stored in the file 190 contains the information for generating and enabling a particular generator sequence. Various embodiment data 155 is shown in FIG. 2. Referring to FIG. 2, data 155 stored in the file 190 includes information on the input device(s) 210, e.g., microphone, mouse, keypad, stylus, etc., and input type(s) 220, e.g., voice, music, mouse clicks, etc., that can be used with a particular generator sequence. An embodiment file 190 also includes information on the structure of the generator sequence 230, e.g., short or long, simple or complex, etc. In an embodiment, the file 190 further includes the level of skill 240, if any, required for operation of, or interaction with, the generator sequence.

Information on the granularity of user control 250 over the generator sequence output(s) is also stored in an embodiment file 190. Additionally, in an embodiment the file 190 includes information on the effects 260, e.g., graphic and/or audio generated by files and/or functions stored in content sets 115, which are output to a user throughout the generator sequence and in response to user inputs.

In an embodiment the file 190 contains information 270 on the number of content pieces 195 in a particular content set 115. In an embodiment, the information 270 on the number of content pieces 195 indicates how many, and which, content pieces 195 of a content set 115 are to be used for effects for each of the feedback elements of the generator sequence. In an embodiment, the information 270 on the number of content pieces 195 of a content set 115 also indicates how many, and which, content pieces are to be used for sequence benefit effects.

In an embodiment the file 190 contains information 280 on discrete point effects, i.e., effects, if any, to be output at discrete points in a generator sequence, e.g., the beginning and the end of a generator sequence.

In an embodiment the file 190 contains external application data 290. Referring again to FIG. 1, the external application data 290 is used by the generator 105 to function with one or more external applications 125, e.g., a software renderer, a particle effects generator, etc., and/or a main application 140, e.g., a game engine, etc.

In other embodiments, various subsets of the data 210, 220, 230, 240, 250, 260, 270, 280 and 290 are stored in the file 190. In still other embodiments, additional and/or different data 155 is stored in the file 190. Alternatively, in other embodiments, combinations of data 210, 220, 230, 240, 250, 260, 270, 280 and 290 and/or other data 155 are stored in the file 190 and/or other additional files, for use by the generator 105.

Exemplary Generator Sequence

As noted, in an embodiment the generator engine 120 defines a generator sequence for an application, or some subset of an application. As a rudimentary example, a generator instance, or application, can be designed to require a user to "shake" a beehive graphically displayed on an output display device in order to cause bees to fly out of the beehive and create a swarm that spells a predefined word, e.g., "BEE".

Figure 3:
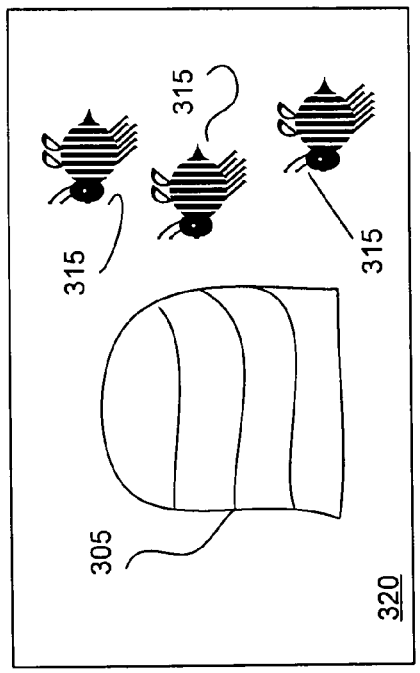
FIG. 3 depicts exemplary graphics panels for an exemplary bee generator sequence.
Figure 3:
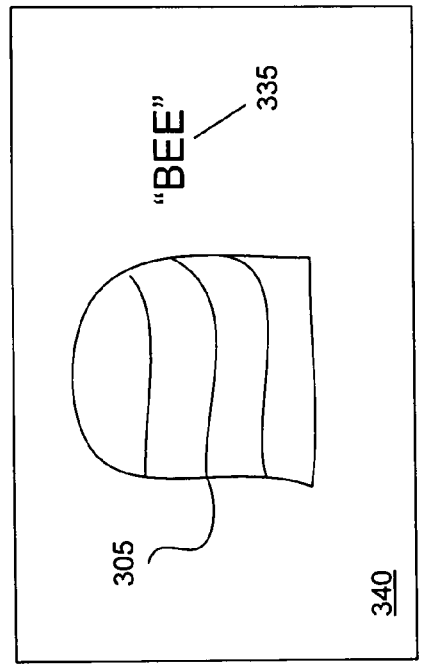
Figure 3:
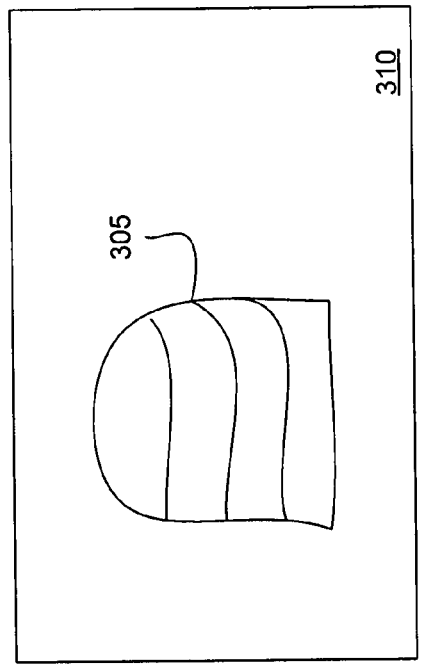
Figure 3:
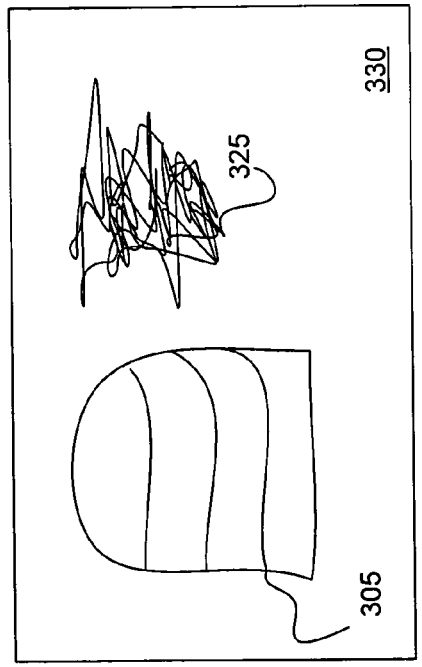

Referring to FIG. 3, a simplified exemplary generator sequence is established for this bee generator instance that has four defined points in the generator sequence path from beginning to end. At an initial point, point one, shown in panel 310, a beehive 305 is displayed on a user's computer graphical interface. The user can attempt to "shake" the beehive 305 by, e.g., rubbing a stylus back and forth on the displayed beehive 305. The user's initial attempts to shake the beehive 305, if indeed the user does create a shaking movement, forwards the user to point two in the generator sequence, shown in panel 320. In panel 320 one or more bees 315 fly out of and buzz around the beehive 305. In the present example, if the user stops or slows down the shaking of the beehive 305, e.g., stops or slows down moving the stylus back and forth on the displayed beehive 305, the one or more bees 315 disappear back into the beehive 305 and the user is repositioned at point one in the generator sequence, displayed in panel 310.

In the example, if, alternatively, the user shakes the beehive 305 harder, e.g., presses down harder on the stylus and/or increases the pace of the back and forth rubbing of the stylus on the displayed beehive 305, the user is progressed to point three in the generator sequence, displayed in panel 330. In panel 330 a swarm of bees 325 now buzz around the beehive 305. Once again, in this example if the user slows down or stops shaking the beehive 305, the swarm of bees 325 disappears and the user is repositioned back to point two, or even point one, in the generator sequence.

Alternatively, in this example if the user continues to shake the beehive 305 even harder while at point three of the generator sequence, ultimately the programmed output is provided at the final, forth, point in the generator sequence. This final point, as displayed in panel 340, rewards the user with the output of the generator sequence. In the present example, the word "BEE" 335 is displayed to the user for having effectively shaken the displayed beehive 305 and successfully mastered the generator sequence.

In an embodiment, exemplified in the above-described bee generator sequence, a generator sequence is a path a user can progress, or regress, along by providing meaningful input, and responding to effectively real-time feedback. The entire process can be based on real-life experience, e.g., shake a beehive to cause the bees inside to fly out. Using a generator 105 to define and manage a generator sequence engages a user in an application by applying the user's unique inputs to determine the application's progression, in effect seemingly tailoring an application to a particular user's responsiveness to the application.

For example, if in the bee generator sequence a user simply had to click with a mouse on the beehive 305 displayed in each panel 310, 320 and 330 to progress through the application and achieve the output, e.g., the word "BEE" 335, a large percentage, if not all, users would have the identical experience of progressing from panel one 310 to panel 340 in very short order.

However, in the simplified bee generator sequence example of FIG. 3, a user must "shake" the beehive 310 harder and harder to progress through the panels 310, 320 and 330 and achieve the application's output of panel 340. The application's progression, thus, becomes more user unique, as different users learn, and master, both "shaking" the beehive 305 and "shaking" the beehive 305 harder and harder at different rates. Some users will stay at panel 310 much longer than others, as they learn to "shake" the beehive 305. Some users will stay at panel 320 or 330 much longer than others, as they learn to "shake" the beehive 305 harder and harder. And some users will even regress from, e.g., panel 330 to panel 320 or panel 310, if they reduce, or prematurely discontinue, their shaking efforts.

The panels 310, 320, 330 and 340 of the exemplary bee generator sequence of FIG. 3 are generated by graphic files that constitute the content set 115 for the bee generator sequence. Each one of the panels 310, 320, 330 and 340 are feedback and/or benefit effects that are output to a user based on the user's progression through the bee generator sequence.

Content Set Types

Figure 4:
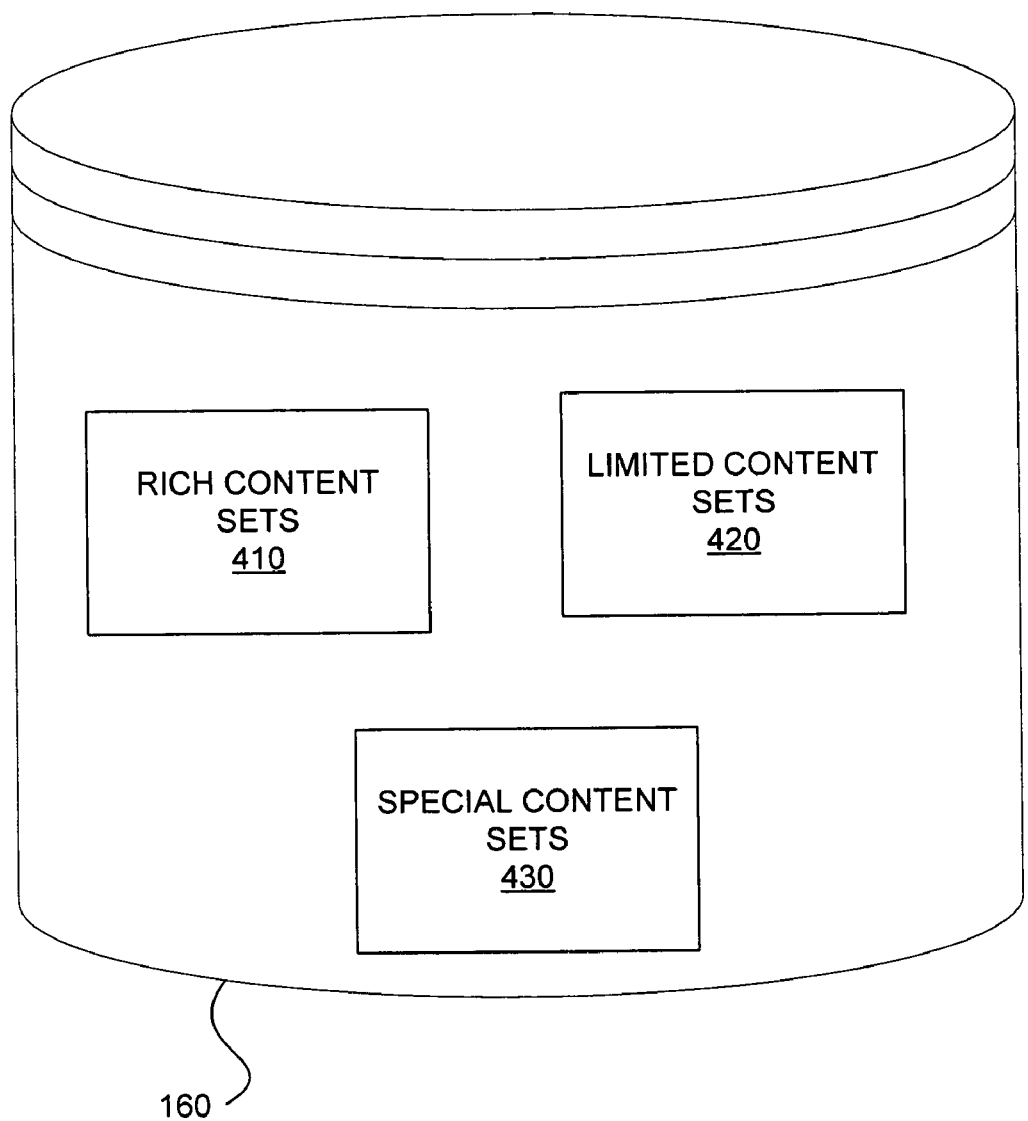
FIG. 4 depicts embodiment content sets for providing output to a generator system user.

Referring to FIG. 4, in an embodiment a GFX/SFX assets library 160 contains one or more types of content sets 115. In an embodiment, rich content sets 410 contain standard distribution content, i.e., a rich, or full, complement of content pieces 195, designed for users to perceive generator sequence output, e.g., graphics and/or audio, as evenly distributed across a conceptual continuum. An exemplary rich content set 410 has a series of audio files that each presents a tone that, when put in a particular order and output to a user, rise in a continuous sequential pitch.

In an embodiment, a GFX/SFX assets library 160 also, or alternatively, contains limited content sets 420 that are designed for a skewed distribution output across a generator sequence continuum. The limited content sets 420 contain a thin, i.e., limited, number of output effects files and/or functions. In an embodiment, a limited content set 420 can have its content distribution skewed towards one or the other end of the generator sequence continuum.

In an exemplary limited content set 420, eighty percent (80%) of the files and/or functions are used at the start of a generator sequence and twenty percent (20%) are used at the end. In this manner, with a limited continuum of content pieces 195, a user can be provided early, rapid benefits (eighty percent (80%) of the existing content pieces generated effects) for correctly interacting with the application, to sufficiently engage the user. The early, rapid benefits can hook the user to stay involved, where they will then have to exert increasingly more effort to obtain the remaining effects, and final generator sequence output, supplied by the last twenty percent (20%) of the content pieces 195 of the limited content set 420.

In an embodiment, a GFX/SFX assets library 160 additionally, or alternatively, contains special content sets 430 that do not represent a continuum, but rather are discrete in nature. Special content sets 430 contain one or more content pieces 195 that are output to a user at discrete points in a generator sequence, e.g., at the beginning, at the end, and/or at various predefined positions in the generator sequence.

In an embodiment, a special content set 430 can be used in conjunction with a rich content set 410 or a limited content set 420 to provide additional feedback and/or benefit effects to a user at preordained points in a generator sequence. In this manner, effects (feedback and/or benefit) can be output to a user from a rich content set 410 or a limited content set 420 that correspond to the user's current position in the generator sequence, and effects (feedback and/or benefit) can be output also from a special content set 430 that indicate the user's relative position in the generator sequence, e.g., at the beginning, fifty-percent complete, at the end, etc.

Input Handler

In an embodiment the input handler 110 of a generator 105 receives data 101 from one or more input devices, processes the input data 101 for the generator's use, and provides, or otherwise makes available, data 145 to the effects picker 130 and data 165 to the generator engine 120.

In an embodiment, the input handler 110 performs operations in a standard, default, manner pursuant to parameter values established in the file 190. In an embodiment, the input handler 10 can also perform operations in a modified manner as established by interaction designer established parameter values stored in the file 190.

Figure 5:
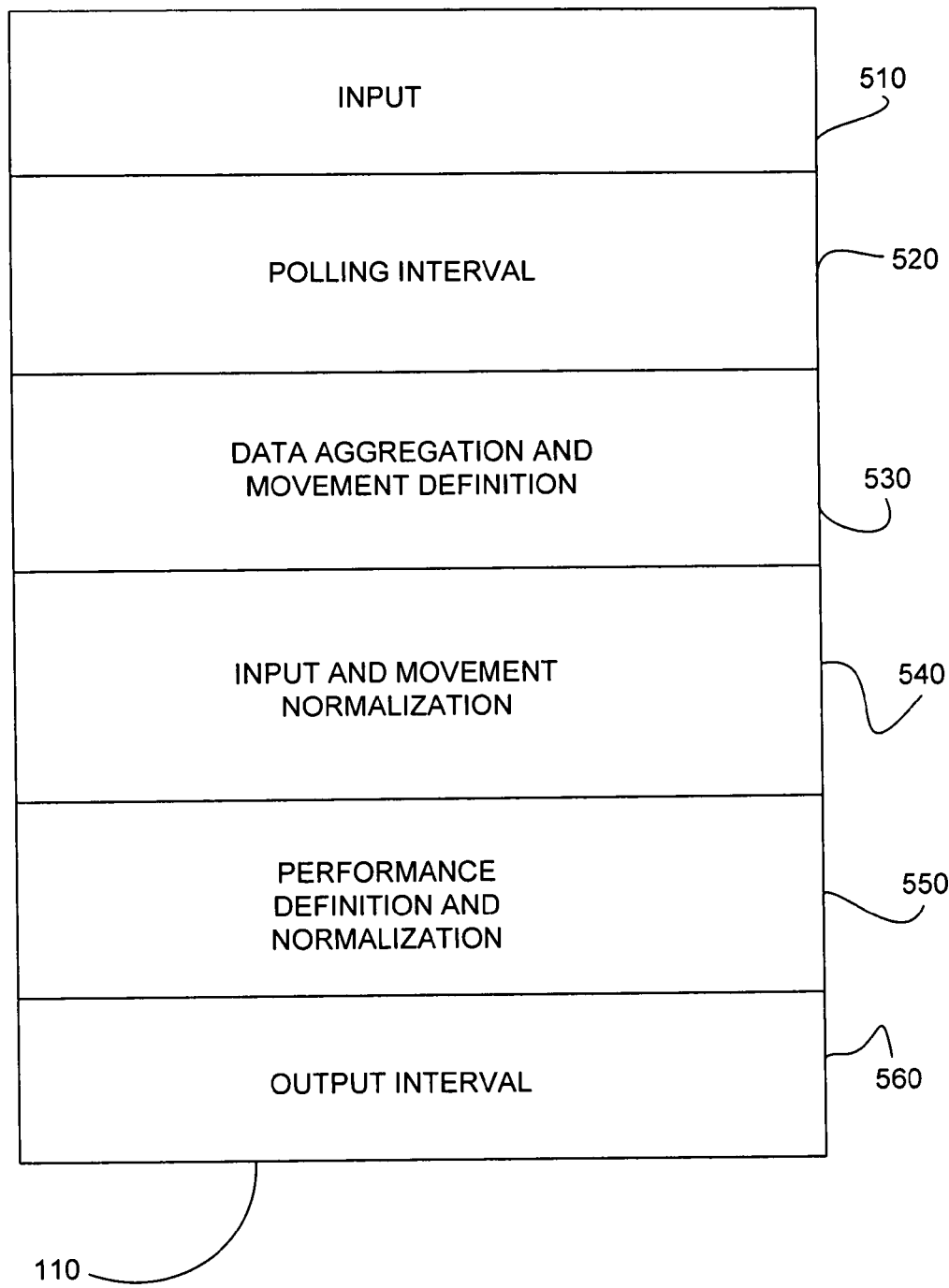
FIG. 5 depicts an embodiment input handler of a generator.

An embodiment input handler 110, shown in FIG. 5, has a number of elements, including an input element 510, a polling interval element 520, a data aggregation and movement definition element 530, an input and movement normalization element 540, a performance definition and normalization element 550 and an output interval element 560. Other embodiment input handlers have more or less elements. In an embodiment, an element of an input handler 110 is a function designed to accomplish a specific objective, or perform a specific task. Elements of an input handler 110 can be, but are not limited to, software functions, software modules, software applications, hardware components, a combination of hardware components, or any combination thereof.

The input element 510 of the input handler 110 handles communications with the input devices, as well as the input and processing of the data 101 from the input devices. As previously noted, in an embodiment, the input handler 110 receives inputs 101 from any known, or any combination of any known, input device, such as, but not limited to, a computer mouse, a computer stylus, a keyboard, a graphics display touch screen, a joy stick, a microphone and a camera.

The polling interval element 520 of the input handler 110 manages one or more polling intervals of the various input devices. In an embodiment the input handler 110 polls the various input devices at a predefined rate, or rates, to determine if there is any input data 101 to receive and process. In an embodiment the one or more polling intervals are each thirty (30) milliseconds (msecs) or less, to produce acceptable levels of user-perceived input responsiveness.

In an alternate embodiment an interrupt element of an input handler 110 is responsible for processing the inputs 101 from the various input devices. In this alternative embodiment the input handler 110 reacts to an interrupt that informs the input handler 110 there is input data 101 from a particular input device. The input handler 110 then processes the input data 101 for use by the generator engine 120 and the effects picker 130.

The data aggregation and movement definition element 530 of the input handler 110 directs the aggregation of some of the inputs 101 over time. In an embodiment some inputs are aggregated over time and processed into new data which defines user movements, e.g., direction change, circle, etc. In an embodiment, user movements reflect users' real-world concepts of a series of inputs. For example, as discussed above, inputs generated by a user rapidly rubbing a computer stylus back and forth can be aggregated to define a user shake movement. As another example, inputs from a repeated stroke of a computer stylus in one direction with a lift and drop between each stroke can be aggregated to define a user strum movement.

The utility of input data aggregation to define a user movement is that generally users can intuitively understand the movements, from real-world experiences, and can use this understanding to optimize their performance of the movements when attempting to master a generator sequence.

In an embodiment the aggregation of inputs that establishes a user movement is matched to the appropriate overt structure which defines the movement. In an embodiment the overt structures for fixing various user movements include, but are not limited to, shaking, petting, strumming, flicking, tracing, pecking, whacking, drumming, batting, talking, singing, whispering, shouting, blowing, dodging, hugging, circling, whipping, winding, dragging, uncovering, and plugging.

In an embodiment the input handler 110, via its input and movement normalization element 540, normalizes the input data 101 and user movements, i.e., aggregation of some user input data 101. In an embodiment the raw input data 101 is normalized via pre-defined formulas established for each input device and overt structure, i.e., defined movement. In an embodiment the normalization process involves a procedural weighing of the input data 101. In an embodiment, in some instances the normalization of the input data 101 requires some input data 101 to be buffered over two or more established time intervals in order to attain a minimum, average, or maximum normalization value for an established time span.

In an embodiment the performance definition and normalization element 550 of the input handler 110 selects one or more user inputs 101 and/or one or more user movements and processes the corresponding input data 101 into a performance value 165. In an embodiment the performance value 165 is a normalized value created by a pre-defined formula. Referring to FIG. 1, performance values 165 are provided by the input handler 110 to the generator engine 120. In an embodiment the performance values 165 are used by the generator 105 to determine the user's progression, or digression, along the generator sequence. For example, referring to the shaking overt structure noted above, i.e., a user's rapid back and forth movement with a pointing device, the speed of the back and forth movement, the amplitude of the swing between back and forth, and the direction of the back and forth movement (e.g., up/down or side-to-side) can each be used to create a performance value 165 that defines the user's progress, i.e., where the user is at any one time, in a generator sequence.

In an embodiment an aggregation of two or more performance values 165 derived over an established time interval are used to generate a level of user progress in the generator sequence.

Referring again to FIG. 5, in an embodiment the output interval element 560 of the input handler 110 manages providing, or otherwise making available, various data values at one or more established time intervals to the generator engine 120 and the effects picker 130. In an embodiment, the output interval element 560 provides, or otherwise makes available, a performance value 165 to the generator engine 120 in one or more time intervals that can range from one (1) to thirty (30) msec. In this embodiment, the limited time interval(s) facilitate outputting feedback and benefit sequence effects in user perceived real-time.

In alternative embodiments, the one or more time intervals can have alternative time ranges, e.g., from two (2) to two-hundred (200) msec, from one (1) to fifty (50) seconds, etc.

In an embodiment the output interval element 560 provides, or otherwise makes available, data 145 to the effects picker 130 in one or more time intervals that can range from one (1) to thirty (30) msec. In this embodiment, the limited time interval(s) facilitate providing users feedback and benefit sequence effects in user perceived real-time.

In alternative embodiments, the one or more time intervals can have alternative time ranges, e.g., from two (2) to two-hundred (200) msec, from one (1) to fifty (50) seconds, etc.

In an embodiment, the data 145 that is provided, or otherwise made available, by the input handler 110 to the effects picker 130 includes normalized input data, normalized movement data and the generated performance values. In alternative embodiments, more or less data content is provided, or otherwise made available, by the input handler 110 to the effects picker 130. For example, in one such alternative embodiment, only normalized input data and normalized movement data is provided, or otherwise made available, by the input handler 110 to the effects picker 130.

In an embodiment, the input handler 110 stores some input data for use when processing future user inputs.

Figure 6:
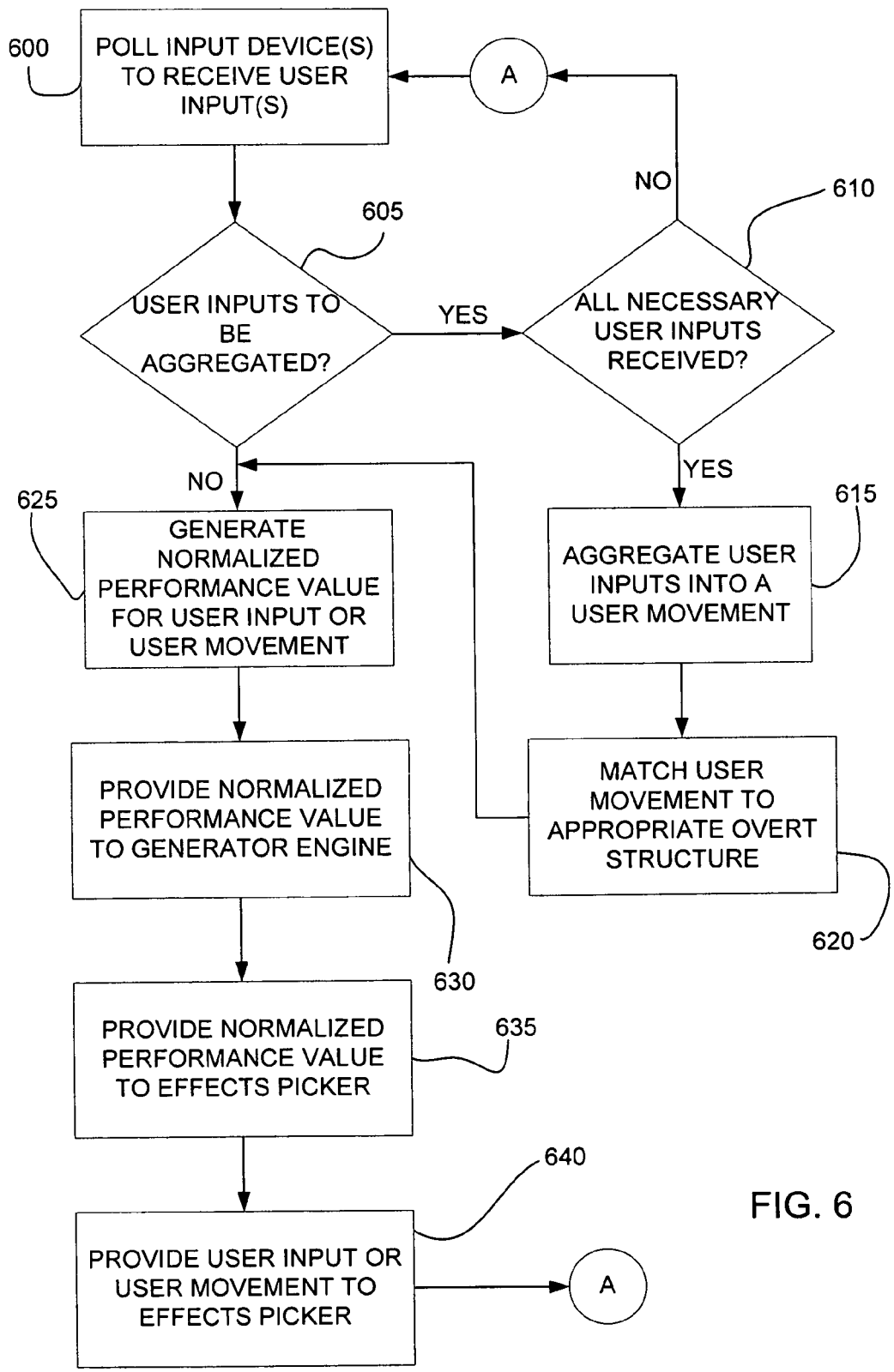
FIG. 6 illustrates an embodiment of a logic flow for an input handler element of a generator.

FIG. 6 illustrates an embodiment logic flow for an input handler methodology. While the following discussion is made with respect to systems portrayed herein, the operations described may be implemented in other systems. Further, the operations described herein are not limited to the order shown. Additionally, in other alternative embodiments more or fewer operations may be performed.

As shown in FIG. 6, an embodiment input handler polls one or more input devices to receive user input 600. At decision block 605 a determination is made as to whether user inputs need to be aggregated. If yes, at decision block 610 a determination is made as to whether all the necessary user inputs for aggregation, i.e., for fixing a user movement, have been received by the input handler. If no, the logic flow loops back to block 600, where the input handler again polls the one or more input devices to receive user input.

If inputs are to be aggregated and the input handler has received all the necessary user inputs, the input handler then aggregates the required user inputs into a user movement 615. The input handler than matches the fixed user movement to the appropriate overt structure 620, e.g., shaking, strumming, petting, etc.

Whether or not user inputs have been aggregated, at block 625 the input handler generates a performance value for the current user input or inputs, i.e., user movement. In an embodiment the generated performance value is a normalized performance value.

The input handler provides the performance value to the generator engine 630. The input handler also provides the performance value to the effects picker 635. The input handler also provides the current user input or inputs, i.e., user movement, to the effects picker 640.

Generator Engine

In an embodiment the generator engine 120 of a generator 105 defines the generator sequence and, with the performance values 165 received from the input handler 110, progresses the user through the generator sequence. In an embodiment the generator engine 120 also further processes the performance values 165 obtained from the input handler 110 and produces data 170 and data 175 for use by the effects picker 130.

The generator engine 120 performs operations according to parameters established in the file 190. In an embodiment one or more parameters are available for modification by the interaction designers in the form of data templates. In an embodiment one or more parameters are also, or alternatively, available for modification by the interaction designers on an individual parameter value basis. In cases where a parameter is not available for modification by the interaction designers, or, if available for modification, is not modified, the generator engine 120 relies on a pre-established default parameter value stored in the file 190 to perform its operations.

Figure 7A:
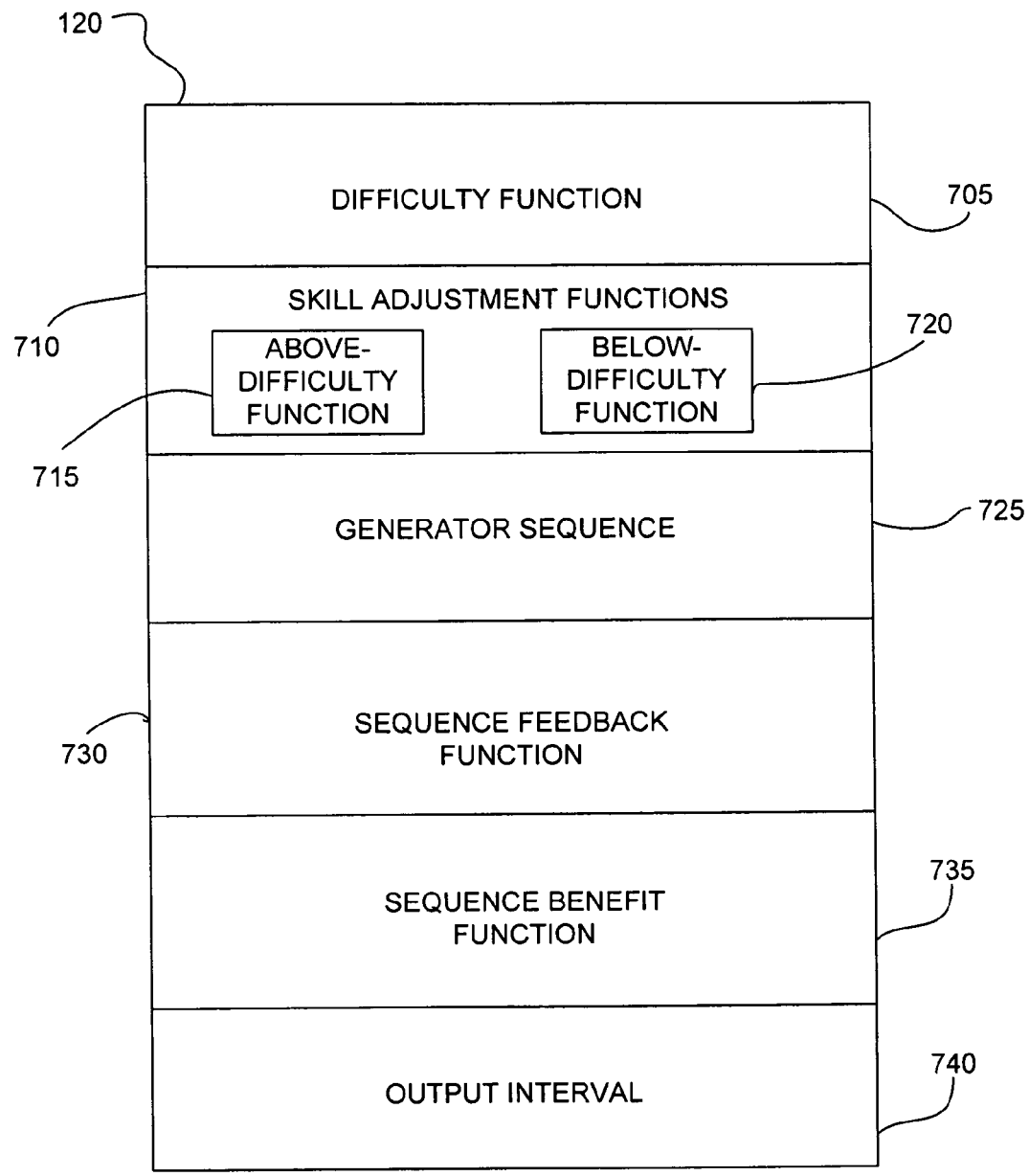
FIG. 7A depicts an embodiment generator engine of a generator.

Referring to FIG. 7A, an embodiment generator engine 120 has various components, or elements, including a difficulty function element 705, a skill adjustment functions element 710, a generator sequence element 725, a sequence feedback function element 730, a sequence benefit function element 735, and an output interval element 740. Other embodiment generator engines have more or less elements. In an embodiment, an element of a generator engine 120 is a function designed to accomplish a specific objective, or perform a specific task. Elements of a generator engine 120 can be, but are not limited to, software functions, software modules, software applications, hardware components, a combination of hardware components, or any combination thereof.

Figure 7B:
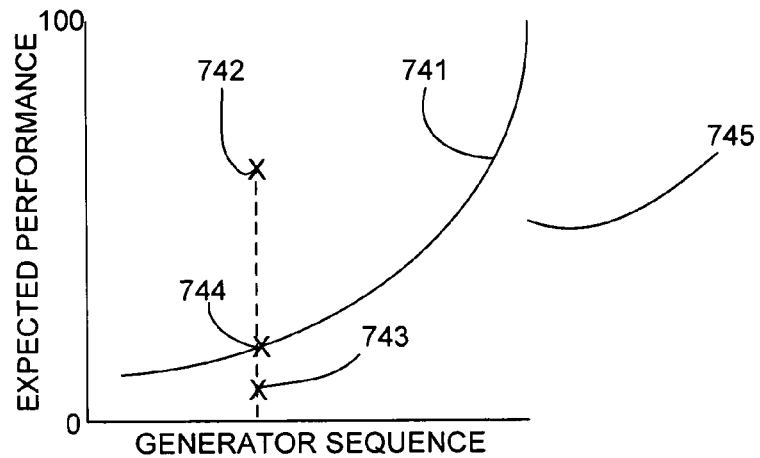
FIG. 7B depicts an exemplary difficulty function curve for use in determining a user's position in a generator sequence.

In an embodiment the difficulty function element 705 of the generator engine 120 is a part of a mechanism for translating the performance values 165 provided by the input handler 110 to a user position along the generator sequence path. In an embodiment the difficulty function element 705 establishes expected performance values for points in the generator sequence path. When connected, the expected performance values create a difficulty function curve. Difficulty function curve 741 of graph 745 in FIG. 7B is an exemplary resultant curve fixed by a difficulty function element 705.

In an embodiment the difficulty function element 705 uses one or more pre-defined formulas to generate the expected performance values and resultant difficulty function curve.

In an embodiment, if a user performance value 165 is greater than the expected performance value for a point in the generator sequence path, e.g., the user performance value 742 is above the difficulty function curve 741, then the user is repositioned forward in the generator sequence, i.e., the user is advanced in the generator sequence. If, however, the user performance value 165 is less than the expected performance value for a generator sequence path point, e.g., the user performance value 743 is below the difficulty function curve 741, the user is repositioned back in the generator sequence, i.e., the user is returned to an earlier point in the generator sequence.

In an embodiment, if a user performance value 165 is the same as the expected performance value for a point in the generator sequence path, e.g., the user performance value 744 is on the difficulty function curve 741, the user is advanced in the generator sequence. In an alternative embodiment, if a user performance value 165 is the same as the expected performance value for a generator sequence path point, e.g., performance value 744, the user is maintained at their current generator sequence position, i.e., they do not advance nor are they returned to an earlier generator sequence path position. In yet another alternative embodiment, if a user performance value is the same as the expected performance value for a path point, e.g., performance value 744, the user is returned to an earlier point in the generator sequence path.

In an embodiment, an interaction designer can choose the embodiment of user performance value matching expected performance value to employ in their generator instance.

In an embodiment, and as shown by exemplary difficulty function curve 741 of FIG. 7B, the difficulty function curve rises, or ramps up, dictating a generator sequence of increasing difficulty over time. In this case, a user will find it increasingly harder to reach the end result, or outcome, of the application as they progress forward through the generator sequence.

In an alternative embodiment, the difficulty function curve is fixed flat, dictating a generator sequence with level difficulty over time. In this case, a user can exert the same effort throughout the application to achieve the end result, or outcome.

In yet another alternative embodiment, the difficulty function curve falls, dictating a generator sequence of reduced difficulty over time. In this case, a user will find it increasingly easier to reach the end result, or outcome, of the application as they progress forward through the generator sequence.

In an embodiment the generator engine 120 has a skill adjustment functions element 710 that is another part of the mechanism for translating performance values 165 provided by the input handler 110 to a user position in the generator sequence path. In an embodiment the skill adjustment functions element 710 adjusts the amount of progression, or regression, a user makes in a generator sequence based on the user's performance above or below the established difficulty function curve and the user's current position in the generator sequence.

In an embodiment the skill adjustment functions element 710 dampens the rates at which well-performing users progress along the generator sequence to keep these highly-skilled users from moving so quickly from start to final outcome that they become bored and potentially disenfranchised from the application. In an embodiment, the skill adjustment functions element 710 also dampens the rate at which poor-performing users regress along the generator sequence, to keep low-skilled users from failing so quickly that they are frustrated and also potentially disenfranchised from the application.

In an embodiment the skill adjustment functions element 710 supports two functions: one for performance above the difficulty function curve established by the difficulty function element 705 ("above-difficulty" function 715) and the other for performance below the difficulty function curve established by the difficulty function element 705 ("below-difficulty" function 720). In an embodiment the above-difficulty function 715 uses one or more pre-defined formulas to generate an above-difficulty skill adjustment curve for a generator sequence. In an embodiment the below-difficulty function 720 uses one or more pre-defined formulas to generate a below-difficulty skill adjustment curve for the generator sequence.

Figure 7C:
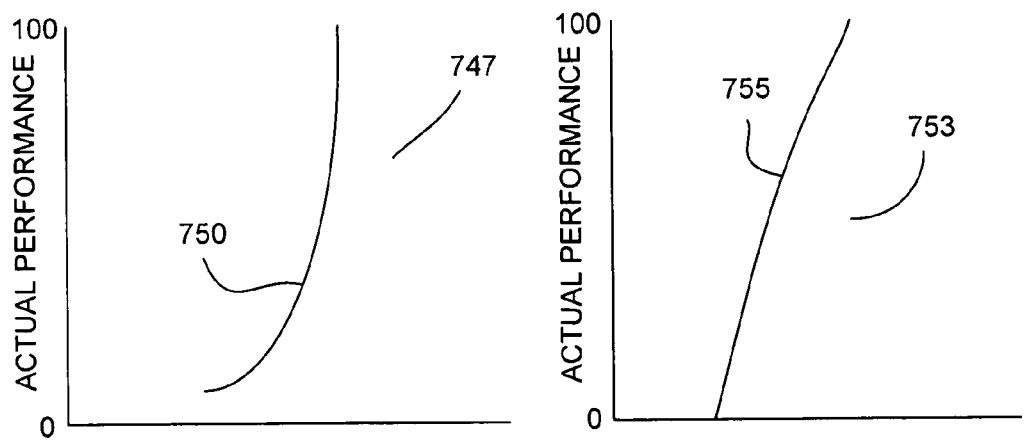
FIG. 7C depicts exemplary skill adjustment curves for use in determining a user's position in a generator sequence.

Curve 750 of graph 747 in FIG. 7C is an exemplary above-difficulty skill adjustment curve fixed by an above-difficulty function 715. Using exemplary above-difficulty skill adjustment curve 750 with exemplary difficulty function curve 741 where a user's performance value at, e.g., time t, is data point 742 in FIG. 7B dampens the user's progression through the generator sequence, in effect, keeping the user from progressing too quickly through the generator sequence.

Curve 755 of graph 753 of FIG. 7C is an exemplary below-difficulty skill adjustment curve fixed by a below-difficulty function 720. Using exemplary below-difficulty skill adjustment curve 755 with exemplary difficulty function curve 741 where a user's performance value at, e.g., time t, is data point 743 in FIG. 7B dampens the user's regression in the generator sequence, in effect, shielding the user from regressing too quickly upon inadequate performance in the generator sequence.

In an alternative embodiment generator engine 120, the difficulty function element 705 and the skill adjustment functions element 710 are combined. In this alternative embodiment a single performance/position element, consisting, e.g., of a single multi-variable function, establishes the difficulty function curve, the above-difficulty skill adjustment curve and the below-difficulty skill adjustment curve.

In an embodiment generator engine 120, a generator sequence element 725 establishes the generator sequence, based on parameters from the file 190. In an embodiment, the generator sequence element 725 also determines the location of a user in the established generator sequence.

In an embodiment the mechanism for determining a user's position in a generator sequence utilizes the expected performance value, the actual performance value and the user's current generator sequence position. The expected performance value is employed to determine whether the user, based on their current input(s), i.e., their actual performance value, is above, below, or on the difficulty function curve. The user's position with respect to the difficulty function curve dictates whether an above-difficulty or below-difficulty skill adjustment curve should be used. In an embodiment, the appropriate skill adjustment curve, e.g., the exemplary above-difficulty curve 750 or the exemplary below-difficulty curve 755 of FIG. 7C, is overlaid with the difficulty function curve, e.g., exemplary difficulty function curve 741 of FIG. 7B, such that the skill adjustment curve intercepts the difficulty function curve at the user's current generator sequence position. A projection is then made from the current user performance point on the skill adjustment curve to establish the user's new generator sequence location point.

Figure 7D:
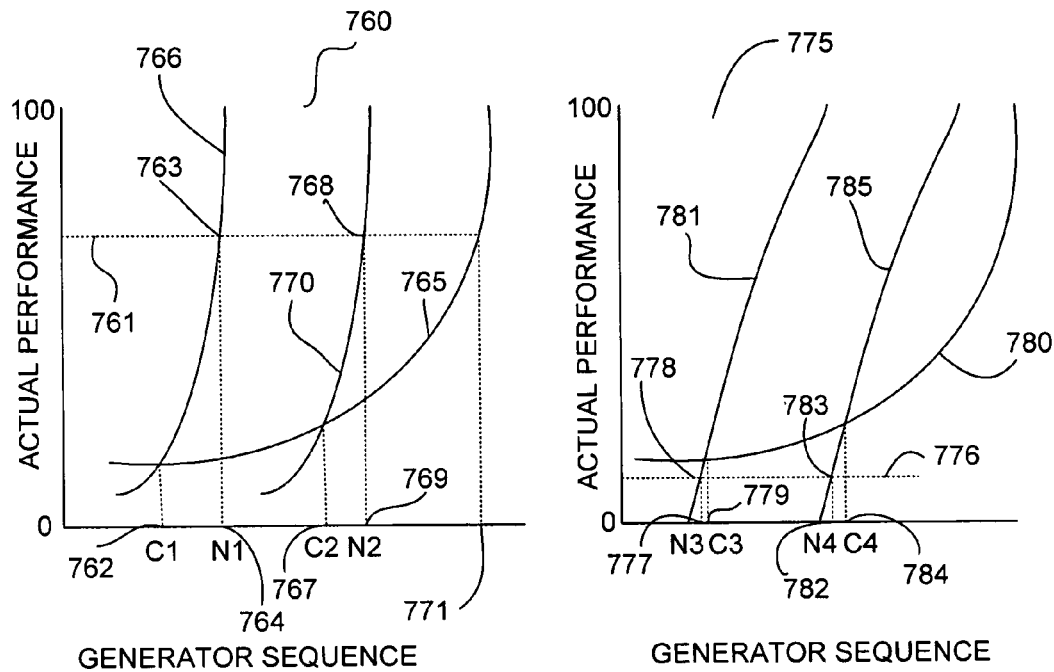
FIG. 7D depicts exemplary graphs with difficulty and skill adjustment curves positioned to determine a user's position in a generator sequence.

For example, referring to exemplary graph 760 of FIG. 7D, a user is currently at point C1 762 in a generator sequence. The user is performing above the established difficulty function curve 765, also referred to herein as the difficulty curve 765, as shown by line 761 (the user's current performance value). Thus, in this example, an above-difficulty skill adjustment curve 766 is overlaid with the difficulty curve 765 such that the above-difficulty skill adjustment curve 766 intercepts the difficulty curve 765 at the user's current generator sequence position, C1 762. A projection is then made from the user's actual performance point on the above-difficulty skill adjustment curve 766, i.e., point 763, where line 761 (actual performance value) intercepts the above-difficulty skill adjustment curve 766, to establish the user's new generator sequence location point, N1 764.

In this example, if the appropriate skill adjustment curve, i.e., above-difficulty skill adjustment curve 766, was not used, the user's new position in the generator sequence, based on the current user performance value, shown by line 761, and the established difficulty curve 765, would have been point 771. Point 771 is much farther along in the generator sequence than point N1 764, established with the use of above-difficulty skill adjustment curve 766. Thus, without the use of a skill adjustment curve, a highly-skilled user may proceed too rapidly through a generator sequence.

Referring again to graph 760, assume our user has progressed in the generator sequence and is now currently at point C2 767. Assume the user continues to perform above the established difficulty curve 765, again on actual performance value line 761. Thus, the above-difficulty skill adjustment curve, curve 770, is again overlaid with the difficulty curve 765 such that the above-difficulty skill adjustment curve 770 intercepts the difficulty curve 765 at the user's current generator sequence position, C2 767. A projection is again made from the user's actual performance point on the above-difficulty skill adjustment curve 770, i.e., point 768, where line 761 (actual performance value) intercepts the above-difficulty skill adjustment curve 770, to establish the user's new generator sequence location point, N2 769.

As in the prior example, if the appropriate skill adjustment curve, i.e., curve 770, was not used, the user's new generator sequence position, based on the current user performance value shown by line 761, and the established difficulty curve 765 would have been point 771. Point 771 is farther along in the generator sequence than the point N2 769 established with the use of the above-difficulty skill adjustment curve 770.

Graph 760 of FIG. 7D displays how an above-difficulty skill adjustment curve can be used to render it increasingly more difficult for a highly skilled performer to obtain the end result in a generator sequence. In the example, the user, while at current point C1 762 and at current point C2 767 in the generator sequence, performed at the same high performance level, or value, shown by line 761. Yet, the user progressed farther in the generator sequence when at an earlier current position, i.e., from point C1 762 to point N1 764, then when at a later current generator position, i.e., from point C2 767 to point N2 769. Employing an appropriate above-difficulty skill adjustment function can restrain highly skilled performers from obtaining the end result, or output, of a generator sequence too quickly.

Graph 775 of FIG. 7D portrays how a below-difficulty skill adjustment curve is used to dampen a poor performer's regression in a generator sequence. For example, a poor performing user is initially at point C3 779 in a generator sequence path. The user is performing below the established difficulty function curve 780, also referred to herein as the difficulty curve 780, as shown by line 776 (the user's current performance value). In this example, a below-difficulty skill adjustment curve, curve 781, is overlaid with the difficulty curve 780 such that the below-difficulty skill adjustment curve 781 intercepts the difficulty curve 780 at the user's current generator sequence position, C3 779. A projection is then made from the user's actual performance point on the below-difficulty skill adjustment curve 781, i.e., point 778, where line 776 (actual performance value) intercepts the below-difficulty skill adjustment curve 781, to establish the user's new generator sequence location point, N3 777.

In the example, if the appropriate below-difficulty skill adjustment curve was not used the user would have been regressed back to the beginning of the generator sequence for failing to perform at even the minimum required difficulty level for the generator sequence. Thus, without the use of a skill adjustment curve, a poorly-skilled user may never get past the beginning of a generator sequence.

Referring again to graph 775, assume the user has progressed in the generator sequence and is now currently at point C4 784. Assume also that the user now continues to perform below the established difficulty curve 780, on actual performance value line 776. Thus, the below-difficulty skill adjustment curve, curve 785, is overlaid with the difficulty curve 780 such that the below-difficulty skill adjustment curve 785 intercepts the difficulty curve 780 at the user's current generator sequence position, C4 784. A projection is again made from the user's actual performance point on the below-difficulty skill adjustment curve 785, i.e., point 783, where line 776 (actual performance value) intercepts the below-difficulty skill adjustment curve 785, to establish the user's new generator sequence location point N4 782.

Again in this example, if the appropriate skill adjustment curve, i.e., below-difficulty skill adjustment curve 785, was not used the user would have been regressed back to the beginning of the generator sequence for failing to perform at even the minimum required difficulty level.

Referring again to FIG. 7A, in an embodiment generator engine 120, a sequence feedback function element 730 determines a feedback value for various points in a generator sequence. The feedback values, when connected, configure a feedback curve for the generator sequence.

In an embodiment the sequence feedback function element 730 uses one or more pre-defined formulas to generate the feedback values and resultant feedback curve.

Figure 7E:
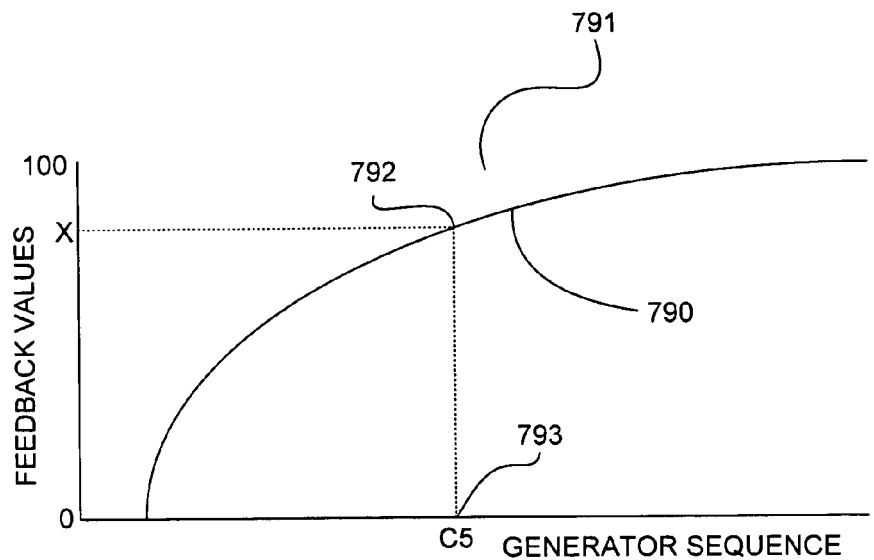
FIG. 7E depicts an exemplary feedback curve for a generator sequence.

In an embodiment, and as shown by exemplary feedback curve 790 of graph 791 in FIG. 7E, the sequence feedback function element 730 shapes the feedback curve with a sharp initial rise followed by diminishing returns. In this embodiment, a user is rewarded with relatively large positive jumps, or steps, in feedback for positive changes in their performance at the beginning of a generator sequence and with relatively small positive adjustments in feedback towards the end of the generator sequence.

In an alternative embodiment the feedback curve is fixed flat, dictating a generator sequence in which the user feedback level remains the same throughout the user's progression in a generator sequence.

Figure 7F:
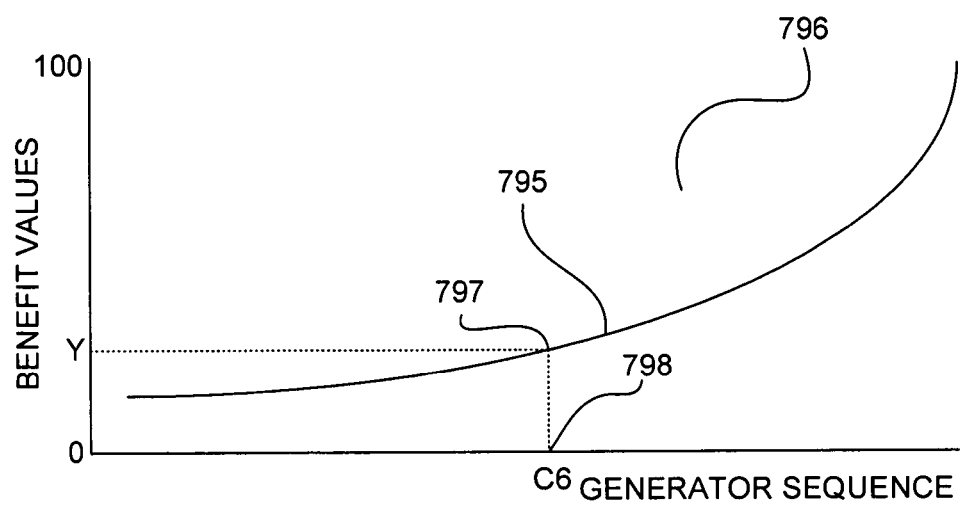
FIG. 7F depicts an exemplary benefit curve for a generator sequence.

In yet another alternative embodiment the feedback curve established by the sequence feedback function element 730 is generally shaped with a slight initial rise followed by increasing returns, such as demonstrated by the shape of, e.g., curve 795 of FIG. 7F. In this embodiment, a user is rewarded with relatively small positive jumps, or steps, in feedback for positive changes in their performance at the beginning of a generator sequence and with relatively large positive adjustments in feedback towards the end of the generator sequence.

In an embodiment the sequence feedback function element 730 fixes a feedback curve for each feedback element in a generator sequence. Thus, for example, in a generator sequence that provides user feedback on both the user's speed and the user's accuracy in tracing a letter, the sequence feedback function element 730 fixes a feedback curve for speed and a feedback curve for accuracy.

Once the user's position in a generator sequence is established by the generator sequence element 725 of an embodiment generator engine 120, the sequence feedback function element 730 can establish a current feedback value for a feedback element, e.g., user speed in tracing a letter. Referring to exemplary graph 791 of FIG. 7E, in an embodiment a projection is made from the user's current position in the generator sequence, e.g., C5 793, to the feedback curve, e.g., feedback curve 790, to establish a current feedback value, e.g., value X 792, on the feedback curve 790. In an embodiment, current feedback value X 792 is provided the effects picker 130 for use in identifying the feedback content piece(s) 195 of a content set 115 to output to the user.

In an embodiment generator engine 120 shown in FIG. 7A, a sequence benefit function element 735 determines a benefit value for various points in a generator sequence. The benefit values, when connected, configure a benefit curve for the generator sequence.

In an embodiment the sequence benefit function element 735 uses one or more pre-defined formulas to generate the benefit values and resultant benefit curve.

In an embodiment, and as shown by exemplary benefit curve 795 of graph 796 in FIG. 7F, the sequence benefit function element 735 shapes the benefit curve with a slow initial rise followed by a sharp rise towards the end of the generator sequence. In this embodiment, user motivation can be enhanced by rewarding the user with small positive jumps, or steps, in benefit for positive changes in user performance at the beginning of a generator sequence and with large positive adjustments in benefit towards the end of the generator sequence.

In an alternative embodiment the benefit curve is fixed flat, dictating a generator sequence in which the user benefits remain level, or the same, throughout the user's progression in a generator sequence.

In yet another alternative embodiment the benefit curve established by the sequence benefit function element 735 is generally shaped with a sharp initial rise followed by diminishing returns, such as shown by the shape of, e.g., curve 790 of FIG. 7E. In this embodiment, a user is rewarded with relatively large positive jumps, or steps, in benefit for positive changes in their performance at the beginning of a generator sequence and with relatively small positive adjustments in benefit towards the end of the generator sequence.

Once the user's position in a generator sequence is established by the generator sequence element 725 of an embodiment generator engine 120, the sequence benefit function element 735 can establish a current benefit value. Referring to exemplary graph 796 of FIG. 7F, in an embodiment a projection is made from the user's current position in the generator sequence, e.g., C6 798, to the benefit curve, e.g., benefit curve 795, to establish a current benefit value, e.g., value Y 797, on the benefit curve 795. In an embodiment, current benefit value Y 797 is provided to the effects picker 130 for use in identifying the sequence benefit content piece(s) 195 of a content set 115 to output to the user.

Again referring to FIG. 7A, in an embodiment generator engine 120, an output interval element 740 manages providing, or otherwise making available, various data values at one or more established time intervals to the effects picker 130. In an embodiment, the output interval element 740 provides, or otherwise makes available, a feedback value 170, e.g., feedback value X 792 of graph 791 in FIG. 7E, to the effects picker 130 in one or more time intervals that can range from one (1) to thirty (30) msec. In an embodiment, the output interval element 740 provides, or otherwise makes available, a benefit value 175, e.g., benefit value Y 797 of graph 796 in FIG. 7F, to the effects picker 130 in one or more time intervals that can range from one (1) to thirty (30) msec. In this embodiment, the limited time interval(s) facilitate providing feedback and benefit sequence effects to users in user perceived real-time.

In alternative embodiments more or less data content is provided, or otherwise made available, by the generator engine 120 to the effects picker 130. In alternative embodiments the one or more time intervals for providing feedback values and/or benefit values to the effects picker 130 can have alternative time ranges, e.g., from two (2) to two-hundred (200) msec, from one (1) to fifty (50) seconds, etc.

Figure 8A:
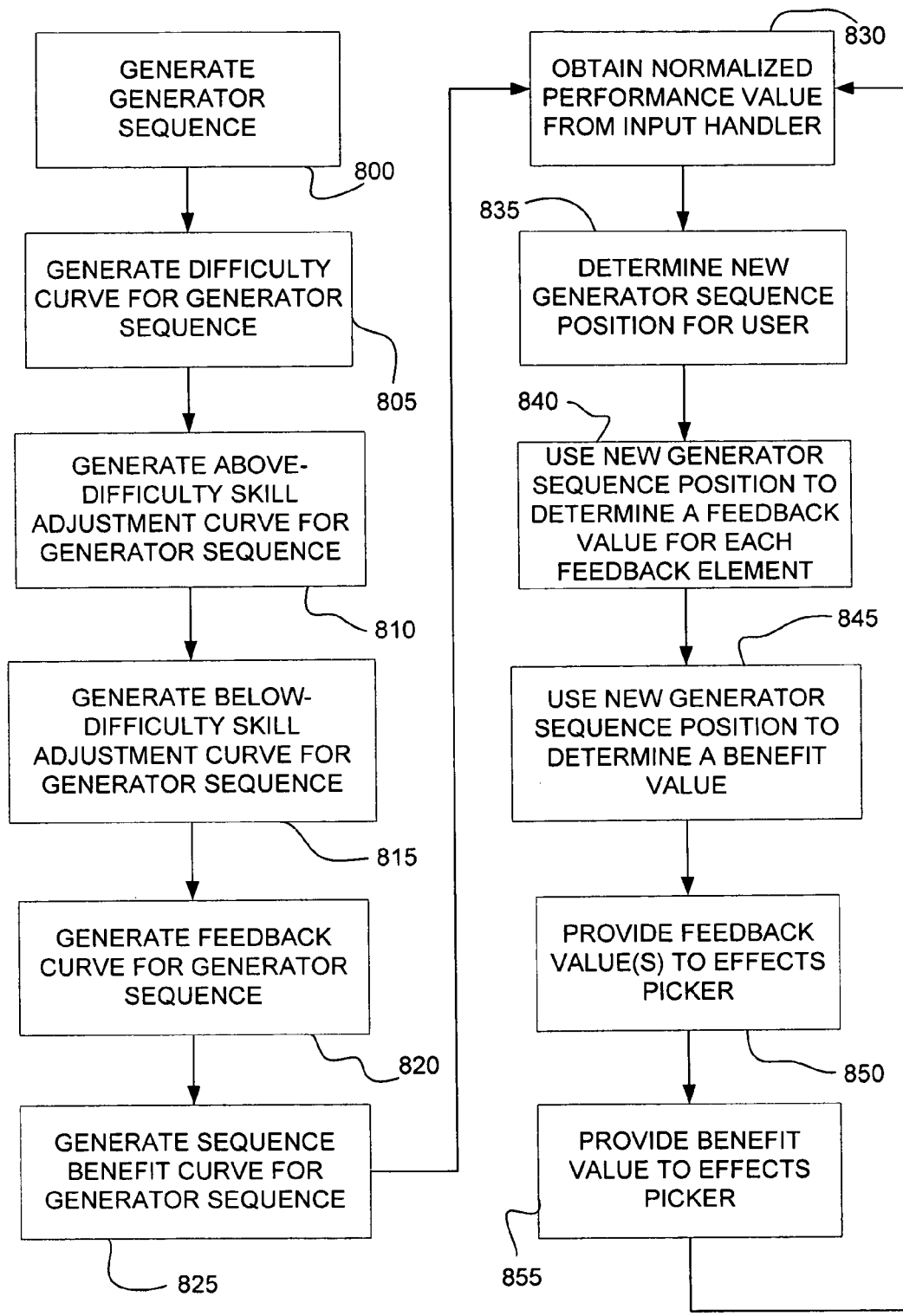
FIG. 8A illustrates an embodiment of a logic flow for a generator engine element of a generator.

FIG. 8A illustrates an embodiment logic flow for a generator engine methodology. While the following discussion is made with respect to systems portrayed herein, the operations described may be implemented in other systems. Further, the operations described herein are not limited to the order shown. Additionally, in other alternative embodiments more or fewer operations may be performed.

As shown in FIG. 8A, an embodiment generator engine generates a generator sequence 800 based on parameters established by an interaction designer that serve to define the generator sequence. The generator engine creates a difficulty function, and resultant difficulty function curve, also referred to herein as a difficulty curve, for the generator sequence 805. The generator engine creates an above-difficulty skill adjustment function, and resultant above-difficulty skill curve, 810 for use when actual performance values are above the difficulty curve. The generator engine also establishes a below-difficulty skill adjustment function, and resultant below-difficulty skill curve, 815 for use when actual performance values are below the difficulty curve.

The generator engine generates a sequence feedback function, and resultant feedback curve, 820 for use with the generator sequence. In an embodiment, the generator engine generates a sequence feedback function, and resultant feedback curve, 820 for each feedback element of a generator sequence.

The generator engine generates a sequence benefit function, and resultant benefit curve, 825, also for use with the generator sequence.

The generator engine obtains performance values established by the input handler 830.

The generator engine establishes a new user position in the generator sequence 835. In an embodiment, the generator engine uses the current performance value, the established difficulty curve and either the established above-difficulty skill curve or the established below-difficulty skill curve to determine a user's new position in the generator sequence 835.

The generator engine uses a user's newly established generator sequence position to determine a feedback value, from the sequence feedback function and resultant feedback curve, for each feedback element of the generator sequence 840. For example, if a generator sequence is established to provide feedback on both a speed element and an accuracy element, the generator engine uses the user's newly established generator sequence position to determine a feedback value for the speed feedback element and a feedback value for the accuracy feedback element.

The generator engine also uses a user's newly established generator sequence position to determine a benefit value 845 from the sequence benefit function and resultant benefit curve.

The generator engine provides the feedback value(s) for each feedback element to the effects picker 850. The generator engine also provides the benefit value to the effects picker 855.

Figure 8B:
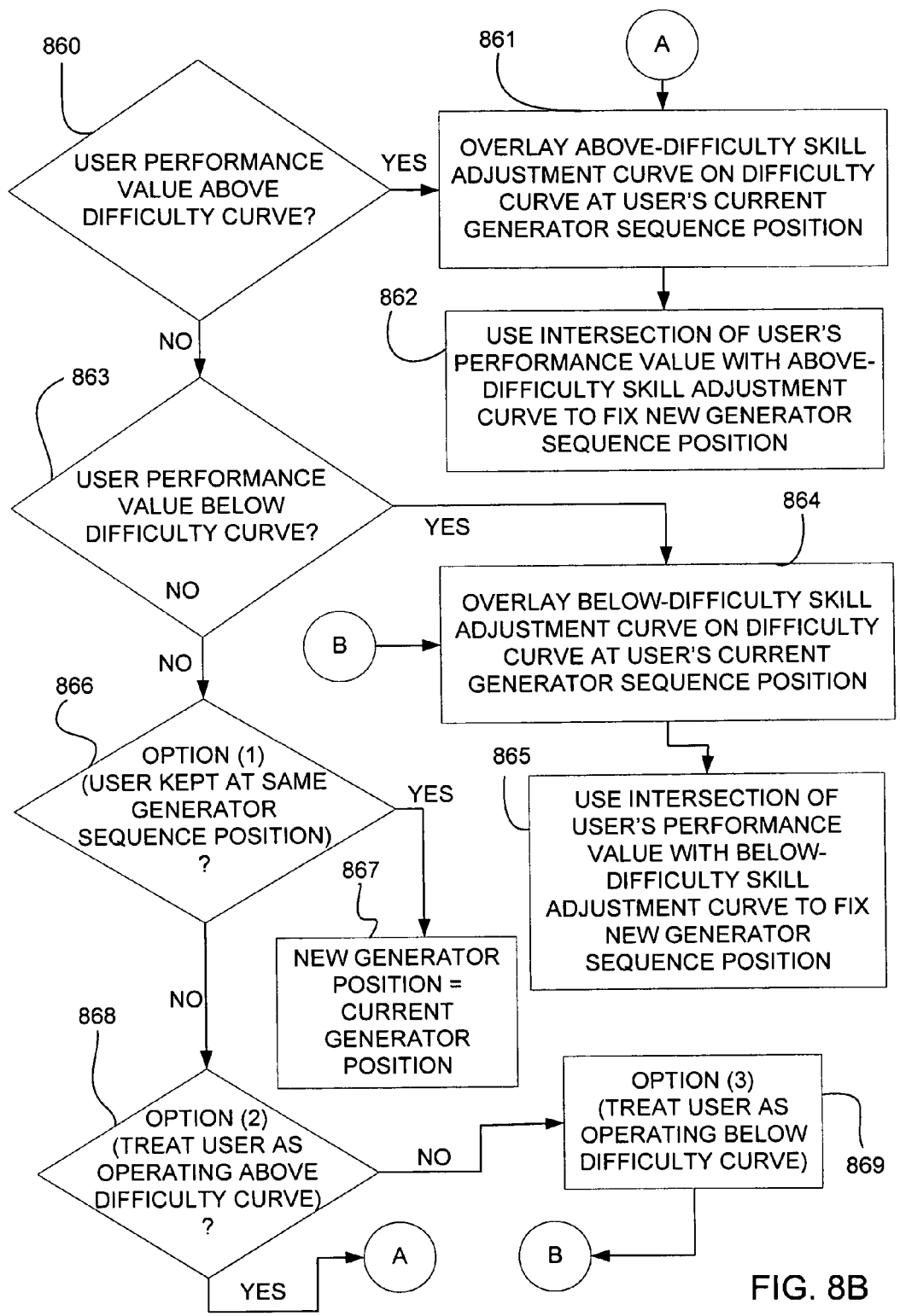
FIG. 8B illustrates an embodiment of a logic flow for a generator engine to determine a new generator sequence position for a user.

FIG. 8B illustrates an embodiment logic flow for step 835 of FIG. 8A, i.e., for the generator engine determining a new generator sequence position for a user. While the following discussion is made with respect to systems portrayed herein, the operations described may be implemented in other systems. Further, the operations described herein are not limited to the order shown. Additionally, in other alternative embodiments more or fewer operations may be performed.

At decision block 860 of FIG. 8B a determination is made as to whether the current user performance value supplied by the input handler is above the established difficulty curve. If yes, the above-difficulty skill curve is overlaid with the established difficulty curve for the generator sequence so that the two curves intersect at the user's current generator sequence position 861. The generator engine then uses the intersection of the user's performance value with the above-difficulty skill curve to fix the user's new generator sequence position 862.

If the current user performance value is not above the established difficulty curve, at decision block 863 a determination is made as to whether the current user performance value is below the difficulty curve. If yes, the below-difficulty skill curve is overlaid with the established difficulty curve for the generator sequence so that the two curves intersect at the user's current generator sequence position 864. The generator engine then uses the intersection of the user's performance value with the below-difficulty skill curve to fix the user's new generator sequence position 865.

If the current user performance value is neither above nor below the established difficulty curve, i.e., it is on the difficulty curve, then at decision block 866 a determination is made as to whether a first option is to be used for handling this situation. If yes, the user is maintained at their current generator sequence position 867. In this manner, if a user of a generator sequence is operating on the established difficulty curve for the generator sequence, they are neither advanced nor regressed, but maintain their current position in the generator sequence.

If the first option is not to be used when a user is operating on the established difficulty curve, then at decision block 868 a determination is made as to whether a second option is to be used for handling the situation. If yes, the user is treated as though they were operating above the established difficulty curve at the present time. Thus, the above-difficulty skill curve is overlaid with the established difficulty curve for the generator sequence so that the two curves intersect at the user's current generator sequence position 861. The generator engine then uses the intersection of the user's performance value with the above-difficulty skill curve to fix the user's new generator sequence position 862.

If neither the first nor the second option are used when a user is operating on the established difficulty curve then a third option is employed 869. In this third option the user is treated as though they were operating below the established difficulty curve at the present time. Thus, the below-difficulty skill curve is overlaid with the established difficulty curve for the generator sequence so that the two curves intersect at the user's current generator sequence position 864. The generator engine then uses the intersection of the user's performance value with the below-difficulty skill curve to fix the user's new generator sequence position 865.

Effects Picker

The effects picker 130 of the generator 105 uses data obtained from both the input handler 110 and the generator engine 120 to determine feedback and sequence benefit effects, i.e., one or more content pieces 195 in one or more content sets 115, to output to a user based on the user's inputs and current generator sequence position.

The effects picker 130 performs operations according to parameters established in the file 190. In an embodiment one or more parameters are available for modification by the interaction designers in the form of data templates. In an embodiment one or more parameters are also, or alternatively, available for modification by the interaction designers on an individual parameter value basis. In cases where a parameter is not available for modification, or, if available for modification, is not modified, the effects picker 130 relies on a pre-established default parameter value stored in the file 190 to perform its operations.

Figure 9A:
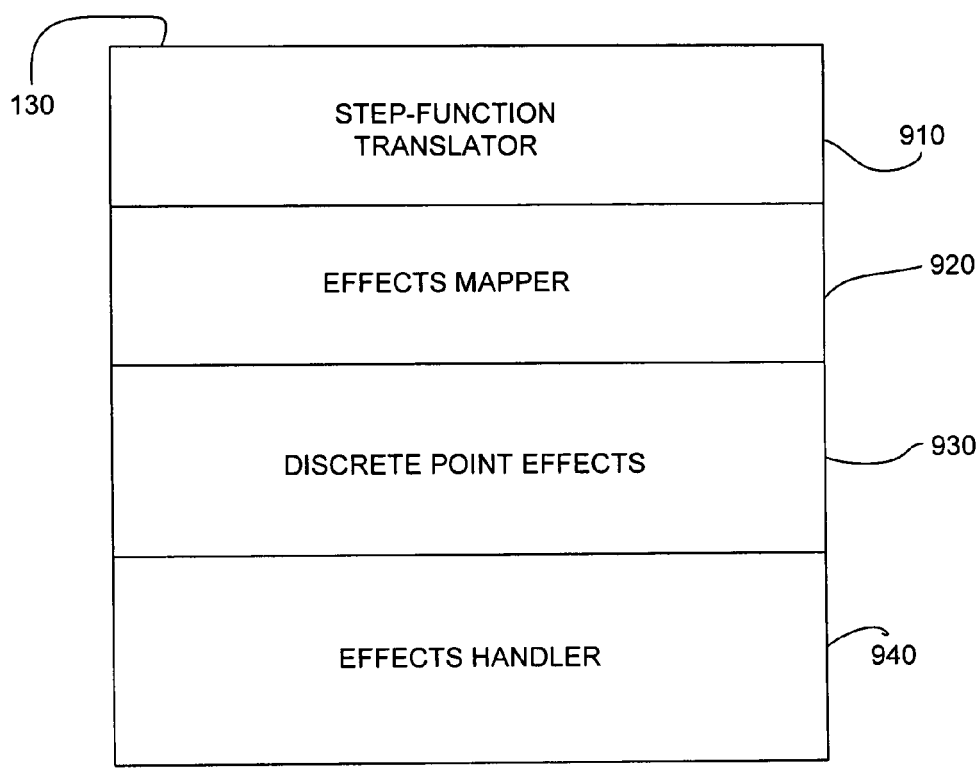
FIG. 9A depicts an embodiment effects picker of a generator.

Referring to FIG. 9A, an embodiment effects picker 130 has various components, or elements, including a step-function translator element 910, an effects mapper element 920, a discrete point effects element 930 and an effects handler element 940. Other embodiment effects pickers have more or less elements. In an embodiment, an element of an effects picker 130 is a function designed to accomplish a specific objective, or perform a specific task. Elements of an effects picker 130 can be, but are not limited to, software functions, software modules, software applications, hardware components, a combination of hardware components, or any combination thereof.

In an embodiment effects picker 130, a step-function translator element 910 accommodates limitations in the quantity of feedback and/or benefit content available for a generator sequence. The objective of the step-function translator element 910 is to put granularity of feedback and benefit content where it is most beneficial such that the feedback and benefits provided a user communicate appropriate generator sequence progression. In an embodiment, the step-function translator element 910 works with limited content sets 420, where the amount of feedback and/or benefit effects granularity established for the generator sequence exceeds the number of content pieces 195 in the limited content set 420 for the generator sequence.

Figure 9B:
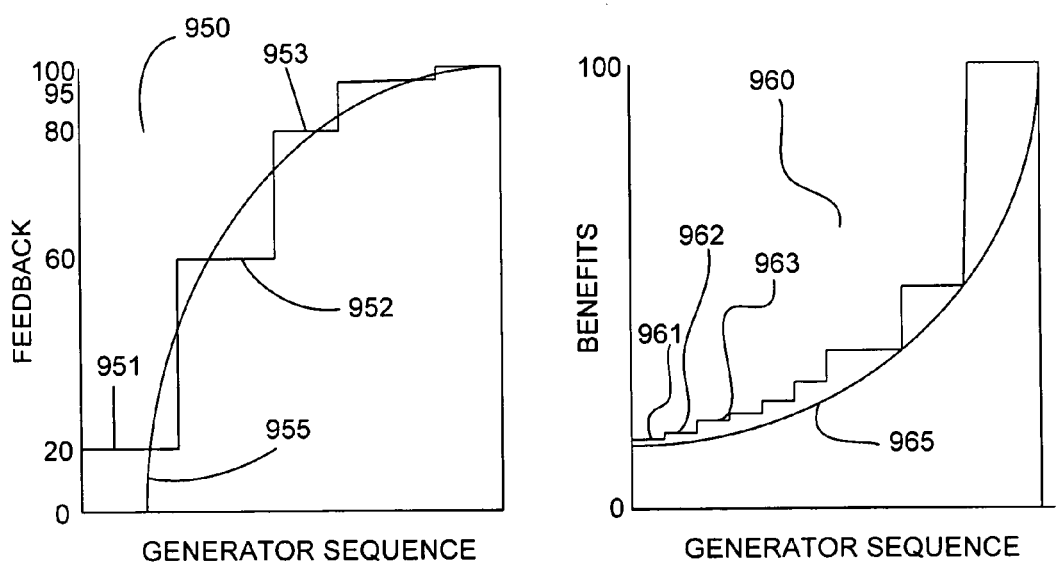
FIG. 9B depicts exemplary feedback value and benefit value step functions for use in determining user feedback and benefit output.

Referring to graph 950 of FIG. 9B, in an embodiment the step-function translator element 910 redefines the feedback curve, e.g., feedback curve 955, as discrete steps, e.g., step 951, step 952, step 953, etc. Referring to graph 960 of FIG. 9B, in an embodiment the step-function translator element 910 redefines the benefit curve, e.g., benefit curve 965, as discrete steps, e.g., step 961, step 962, step 963, etc.

In an embodiment an interaction designer tells the effects picker 130, via one or more parameters in the file 190, how many content pieces 195 in a content set 115 are available for effects for a feedback element of a generator sequence. In an embodiment, the step-function translator element 910 of the effects picker 130 uses this defined number of content pieces 195 to create a step function of feedback that maps the limited feedback effects, i.e., files and/or functions for producing feedback output for the feedback element, to the respective feedback curve.

In the rudimentary bee example of FIG. 3, the interaction designer would have told the effects picker 130, via the file 190, that there were four (4) pieces of feedback content available for the bee generator sequence. The step-function translator element 910 would use this information to, in an embodiment, generate four steps corresponding to the feedback curve for the bee generator sequence, and then map the four content pieces, e.g., four graphics files that generated the four panels 310, 320, 330 and 340 of FIG. 3, to the four feedback steps.

In an embodiment, the step-function translator element 910 puts feedback granularity at the end of the generator sequence. As shown by exemplary graph 950 of FIG. 9B, in this embodiment, larger jumps in the feedback steps are generated at the start of the generator sequence, with smaller jumps in the feedback steps established at the end.

In an embodiment an interaction designer tells the effects picker 130, via one or more parameters in the file 190, how many content pieces 195 are available for benefit effects for a particular content set 115 for a generator sequence. In an embodiment, the step-function translator element 910 of the effects picker 130 uses the defined number of sequence benefit effects content pieces 195 to create a step function of benefit that maps the limited benefit effects, i.e., files and/or functions for producing sequence benefit output, to the benefit curve.

In an embodiment the step-function translator element 910 puts benefit granularity at the beginning of the generator sequence. As shown by exemplary graph 960 of FIG. 9B, in this embodiment, smaller jumps in the benefit steps are generated at the start of the generator sequence, with larger jumps in the benefit steps established at the end.

In an embodiment, the feedback steps, e.g., steps 951, 952 and 953 of graph 950, are then mapped to specific feedback content pieces 195 for the respective feedback element. In an embodiment, the benefit steps, e.g., steps 961, 962, 963 of graph 960, are mapped to specific sequence benefit content pieces 195.

Referring again to FIG. 9A, the effects mapper element 920 of an effects picker 130 maps generator sequence content set files and/or functions to the various potential feedback values and benefit values. In an embodiment, the result of this mapping is a mapper data table.

In an embodiment the effects mapper element 920 of the effects picker 130 maps content set files/functions for rich content sets 410 and limited content sets 420. In an embodiment the effects mapper element 920 maps feedback content pieces 195 of a rich content set 410 to points on the respective feedback curve established by the sequence feedback function element 730 of the generator engine 120 for the feedback element of the generator sequence. In an embodiment the effects mapper element 920 maps benefit content pieces 195 of a rich content set 410 to points on the benefit curve established by the sequence benefit function element 735 of the generator engine 120 for the generator sequence.

In an embodiment the effects mapper element 920 uses the derived feedback steps and benefit steps generated by the step-function translator element 910 of the effects picker 130 to map content set files and/or functions of limited content sets 420 to the various potential feedback values and benefit values. For example, if there are five feedback content pieces 195 available for output to a user for a feedback element, the step-function translator element 910 replaces the feedback curve 955 in graph 950 of FIG. 9B with five feedback steps. The effects mapper element 920 then maps the five feedback content pieces 195 to the established feedback steps. For example, the effects mapper element 920 maps a first feedback content piece for feedback values zero (0) to nineteen (19), a second content piece for feedback values twenty (20) to fifty-nine (59), a third content piece for feedback values sixty (60) to seventy-nine (79), a fourth content piece for feedback values eighty (80) to ninety-four (94), and the fifth, and last, content piece to feedback values ninety-five (95) to one hundred (100). In this manner, the five feedback content pieces 195 available for the specific feedback element in the generator sequence are used to effectively provide user feedback for any feedback value generated by the generator engine 120.

In an embodiment, in a like manner the effects mapper element 920 maps limited content set sequence benefit content pieces 195 to the derived benefit steps, e.g., steps 961, 962, etc., of graph 960, effectively ensuring sequence benefit output for any benefit value generated by the generator engine 120.

In an embodiment, a mapper data table identifies a content set file name for each potential feedback integer value for each feedback element and for each potential benefit integer value for the generator sequence benefit. In an embodiment, the range of feedback values is one to one hundred (1-100). In an embodiment, the range of benefit values is also one to one hundred (1-100). In alternative embodiments, other integer value ranges can be used for either or both the feedback values and/or the benefit values. In alternative embodiments, the range of integer values does not have to be the same for both the feedback values and the benefit values.

In an embodiment, in cases where the content set is procedurally generated, e.g., particle effects, a function is used in place of a content set file name in the mapper data table.

Figure 9C:
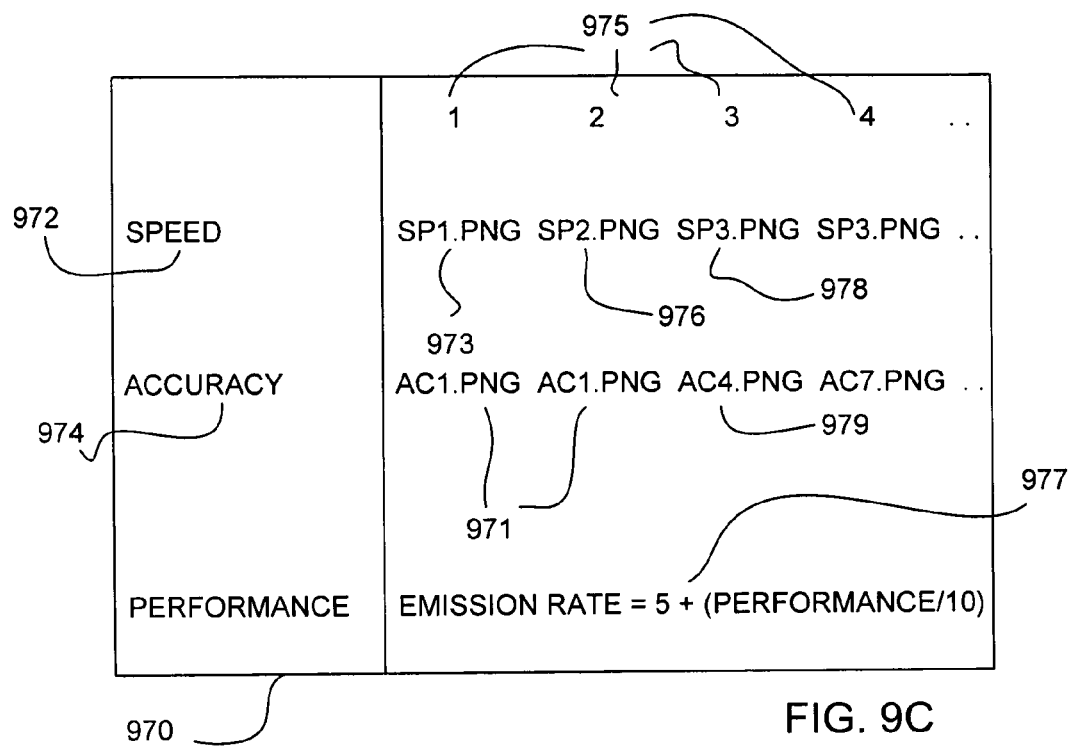
FIG. 9C depicts an exemplary mapper data table.

An exemplary mapper data table 970 is shown in FIG. 9C. In mapper data table 970, two feedback elements are represented: speed 972 and accuracy 974. The generator sequence for which the mapper data table 970 is created provides user feedback on both the user's speed and the user's accuracy. The mapper data table 970 maps a content set file name for each feedback element, i.e., speed 972 and accuracy 974, for each feedback integer value 975, i.e., one (1), two (2), three (3), etc.

Assume, as an example, that the .png files in the mapper data table 970 are graphics files. If a speed feedback value is one (1) graphic file sp1.png 973 is called to produce effects output to the user, if the speed feedback value is two (2) graphic file sp2.png 976 is called to produce effects output to the user, and so on. Likewise, if an accuracy feedback value is one (1) graphic file ac1.png 971 is called to produce effects output to the user, if the accuracy feedback value is two (2) graphic file ac1.png 971 is also called to produce effects output to the user, and so on.

Figure 9D:
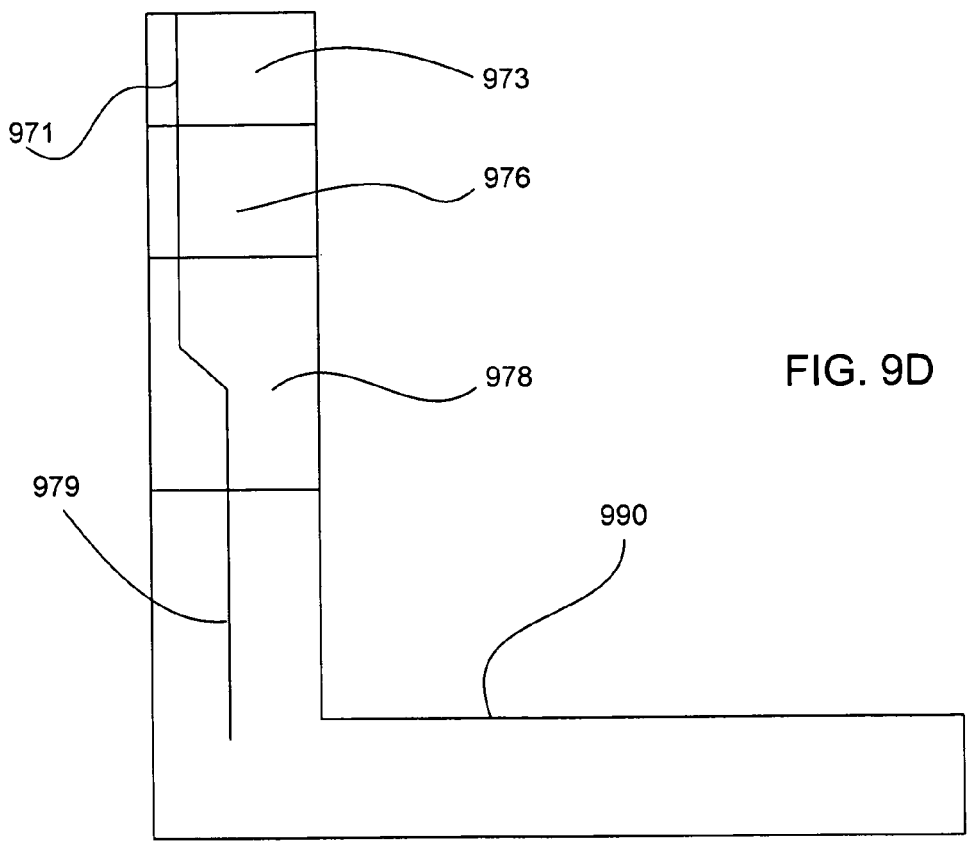
FIG. 9D depicts an exemplary graphic output for a letter tracing generator sequence.

As an example, and referring to FIG. 9D, assume the generator sequence associated with the exemplary mapper data table 970 of FIG. 9C is for tracing a letter, e.g., the letter "L" 990. The content set files associated with the speed 972 feedback element, e.g., files sp1.png 973, sp2.png 976, sp3.png 978, etc., could, as an example, be designed to shade the portion of the letter that has been successfully traced by a user. The faster a user traces the letter "L" 990 of FIG. 9D the more the letter "L" 990 is shaded in.

The content set files associated with the accuracy 974 feedback element, e.g., files ac1.png 972, ac4.png 979, etc., as an example, could be designed to draw a line inside the outlined letter "L" 990. The more accurate the user's trace of the letter L is the closer the drawn line is to the center of the outlined letter "L" 990.

Referring again to FIG. 9C, the exemplary mapper data table 970 maps a function 977 to the benefit values. As an example, the function 977 could determine the rate at which particles are emitted from the line drawn by the various content set files associated with the accuracy 974 feedback element, e.g., files ac1.png 971, ac4.png 979, etc. Particles will be output at an increasingly faster rate from the drawn line as the benefit value increases, ultimately resulting in an explosion of particles when the user successfully finishes tracing the letter "L" 990 of FIG. 9D.

In alternative embodiments, other mechanisms can be used for identifying, or otherwise determining, the content that is mapped to the users' inputs and users' movements, and the derived performance values, feedback values and benefit values.

In an embodiment, the feedback content pieces 195 of a content set 115 are normalized by the interaction designer fitting the overall generator sequence feedback effects into content pieces 195 such that users perceive a normal distribution of the resultant feedback effects across the generator sequence. In an embodiment, the sequence benefit content pieces 195 of a content set 115 are also normalized by the interaction designer fitting the overall generator sequence benefit effects into content pieces 195 such that users perceive a normal distribution of the resultant sequence benefit effects across the generator sequence.

In an embodiment, where one or more feedback effects are procedurally generated, the feedback content, i.e., the respective feedback effects function(s), is normalized by one or more pre-defined formulas such that users perceive a normal distribution of feedback effects across the generator sequence. In an embodiment where one or more sequence benefit effects are procedurally generated, the sequence benefit content, i.e., the respective sequence benefit effects function(s), is normalized by one or more pre-defined formulas such that users perceive a normal distribution of sequence benefit effects across the generator sequence.

Referring once more to FIG. 9A, in an embodiment effects picker 130 a discrete point effects element 930 maps content set files and/or functions of special content sets 430. In an embodiment, the result of this mapping is a discrete point mapping table. As noted, in an embodiment special content sets 430 can be used in conjunction with rich content sets 410 or limited content sets 420 to indicate a user's relative position in the generator sequence, e.g., at the beginning, fifty-percent complete, at the end, etc.

Figures 9E, 9F:
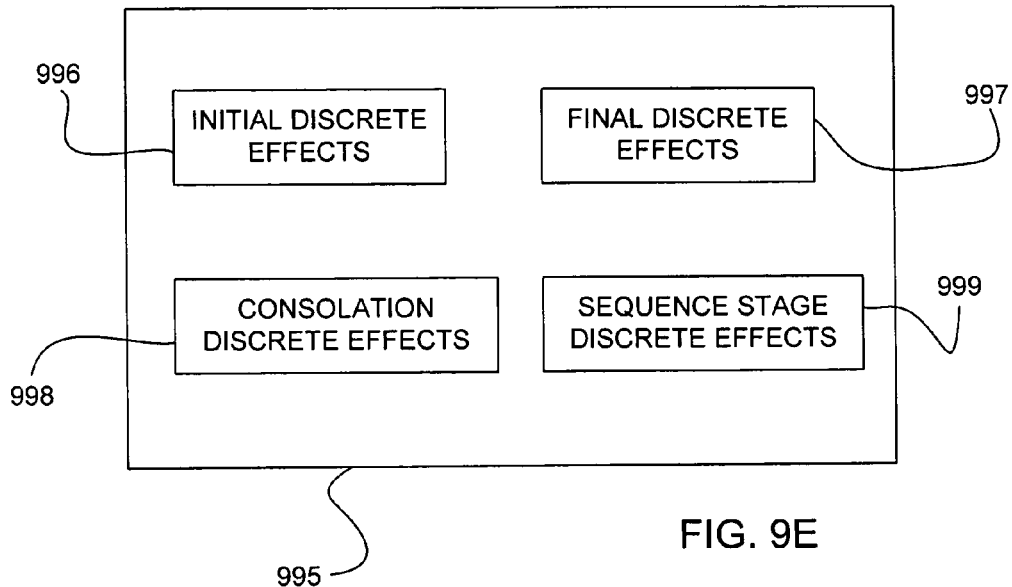
FIG. 9E depicts embodiment discrete effects types.
FIG. 9F depicts an exemplary data table for discrete point effects.

In an embodiment, as shown in FIG. 9E, the discrete point effects element 930 maps content set files and/or functions for four (4) discrete effects types 995: initial 996, final 997, consolation 998 and sequence stage 999. In other alternative embodiments, more, less or different discrete effects types 995 are used by the discrete point effects element 930 for mapping limited content set files/functions for a generator sequence.

In an embodiment the initial discrete effects 996 is the effects, for both feedback elements and the sequence benefit, output to a user at the initiation of a generator sequence. In an embodiment the final discrete effects 997 is the effects, for both feedback elements and the sequence benefit, output to a user at the end of the generator sequence. In an embodiment the consolation effects 998 is the effects, for both feedback elements and the sequence benefit, output to a poor performing user who cannot master the generator sequence.

In an embodiment, the sequence stage effects type 999 can be one or more effects types for various interim points, or stages, in a generator sequence. For example, a generator sequence may be divided into fifty percent (50%) increments, in which case a sequence stage effect(s), for the feedback element(s) and the sequence benefit, is assigned for when a user completes fifty percent (50%) of the generator sequence. In another example, a generator sequence may be divided into twenty-five percent (25%) increments. In this example, a sequence stage effect(s), for the feedback element(s) and the sequence benefit, is assigned for when a user completes twenty-five percent (25%) of the generator sequence. A sequence stage effect(s), for the feedback element(s) and the sequence benefit, is also assigned for when a user completes fifty percent (50%) of the generator sequence, and for when a user completes seventy-five percent (75%) of the generator sequence.

An exemplary discrete point mapping table 980 is shown in FIG. 9F. Both graphic (.png) and audio (.wav) content set files are employed for producing effects for the generator sequence that uses the exemplary discrete point mapping table 980. On a user's initial input(s) to the generator sequence, a start.png graphics file 981 and start.wav audio file 982 are called to produce effects for output to the user. Additionally, a benefit function 985, using benefit value one (1), is executed to generate a sequence benefit output to the user at the start of the generator sequence.

When the user reaches the end of the generator sequence, a final.png graphics file 983 and final.wav audio file 984 are called to output the final generator sequence effects to the user. Additionally, the benefit function 985, using benefit value four (4), is executed to generate the final sequence benefit output to the user.

As a user progresses to each of the defined discrete sequence stages, i.e., accomplishes twenty-five percent (25%) of the corresponding generator sequence, accomplishes fifty percent (50%) of the generator sequence, and accomplishes seventy-five percent (75%) of the generator sequence, the appropriate graphics (.png) and audio (.wav) files identified in the exemplary discrete point mapping table 980 are called to output effects to the user. Likewise, as the user progresses to each of the defined discrete sequence stages, the benefit function 985, using the appropriate benefit value, is executed to generate an appropriate sequence benefit output to the user.

In the exemplary discrete point mapping table 980, if a user fails to successfully accomplish the corresponding generator sequence, a consolation output is provided. In the example, consolation effects are created by the bail.png graphics file 986 and the bail.wav audio file 987. The benefit function 985 is also executed, using a benefit value of one (1), to generate a consolation benefit output for the user.

Referring again to FIG. 9A, in an embodiment effects picker 130 the effects handler element 940 arbitrates effects instructions before any files, e.g., graphic and/or audio, are called for producing effects output to the user, and/or any functions are executed for resultant user output. In this manner, resolution of the identification of output is made when a situation occurs that results in two, or potentially more, content set files and/or functions, i.e., effects, being identified based on the users' inputs and movements, and the derived performance values, feedback values and benefit values.

In an embodiment the effects handler element 940 determines whether a specific effect, e.g., graphic and/or audio, flagged for output to a user should be delayed, i.e., sequenced, or even suppressed, i.e., not output to the user at all, when multiple effects files and/or functions are called within the same relatively brief time period. The effects handler element 940 assists in avoiding an effects cacophony that could preclude the user from perceiving the individual effects.

As an example, assume a generator sequence has an effect that consists of a bell that rings for one (1) second with each user step forward in the sequence. In this example there is also an effect of a bell ringing for three (3) seconds upon a user's completion of the generator sequence. At the moment a user completes the exemplary generator sequence, both the one second bell and the three second bell conditions are met, i.e., the user has made a step forward in the generator sequence and the user has completed the generator sequence. Without the functionality of the effects handler element 940 both effects (one second bell ring and three second bell ring) would be output to the user. The effects handler element 940, however, arbitrates between these two scheduled effects, suppressing one of them from being output, e.g., the one second bell is suppressed and only the three second bell is output to the user at the end of the generator sequence.

In some embodiments there are additional components to one or more of the formulas and/or curves used by the input handler 110, the generator engine 120 and the effects picker 130 that, e.g., create user engagement bumps in feedback and/or benefit effects, reward initial user inputs that create a particular user performance value and/or fall within a specified user performance value range, provide mid-generator sequence peaks and/or valleys in feedback and/or benefit effects, create aborted generator sequence consolation effects, etc.

Figure 10A:
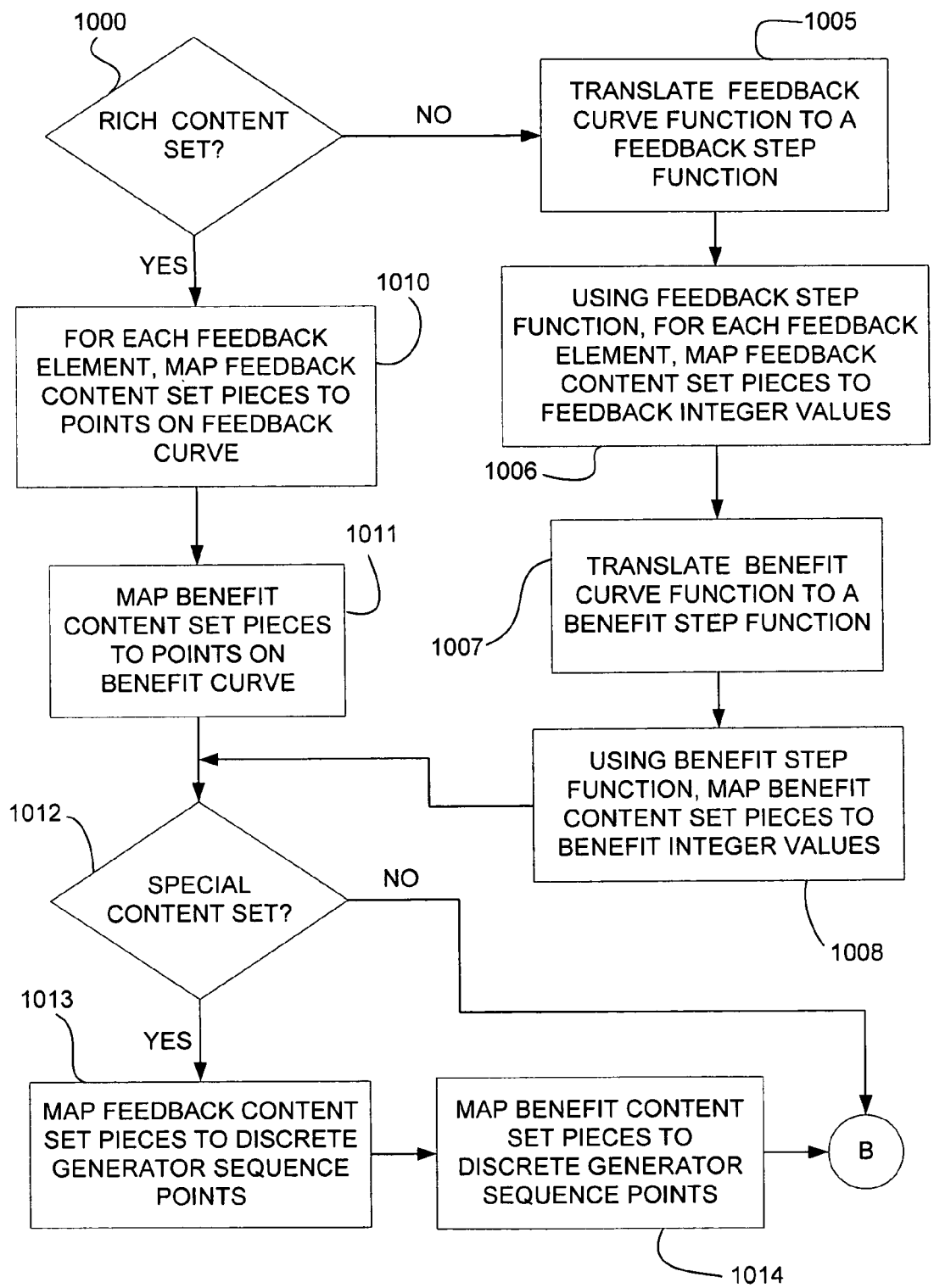
FIGS. 10A, 10B and 10C illustrate an embodiment of a logic flow for an effects picker element of a generator.
Figure 10B:
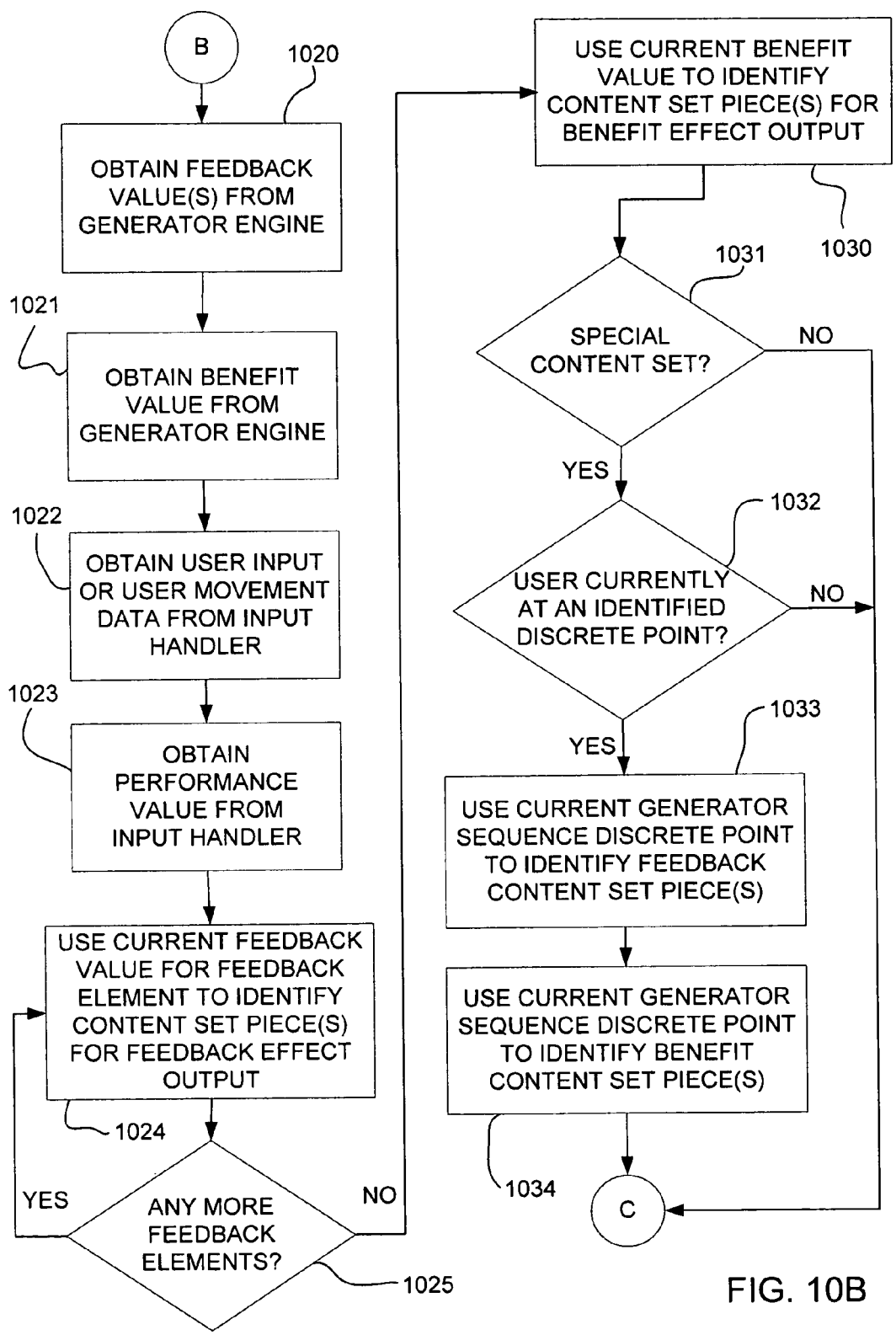
Figure 10C:
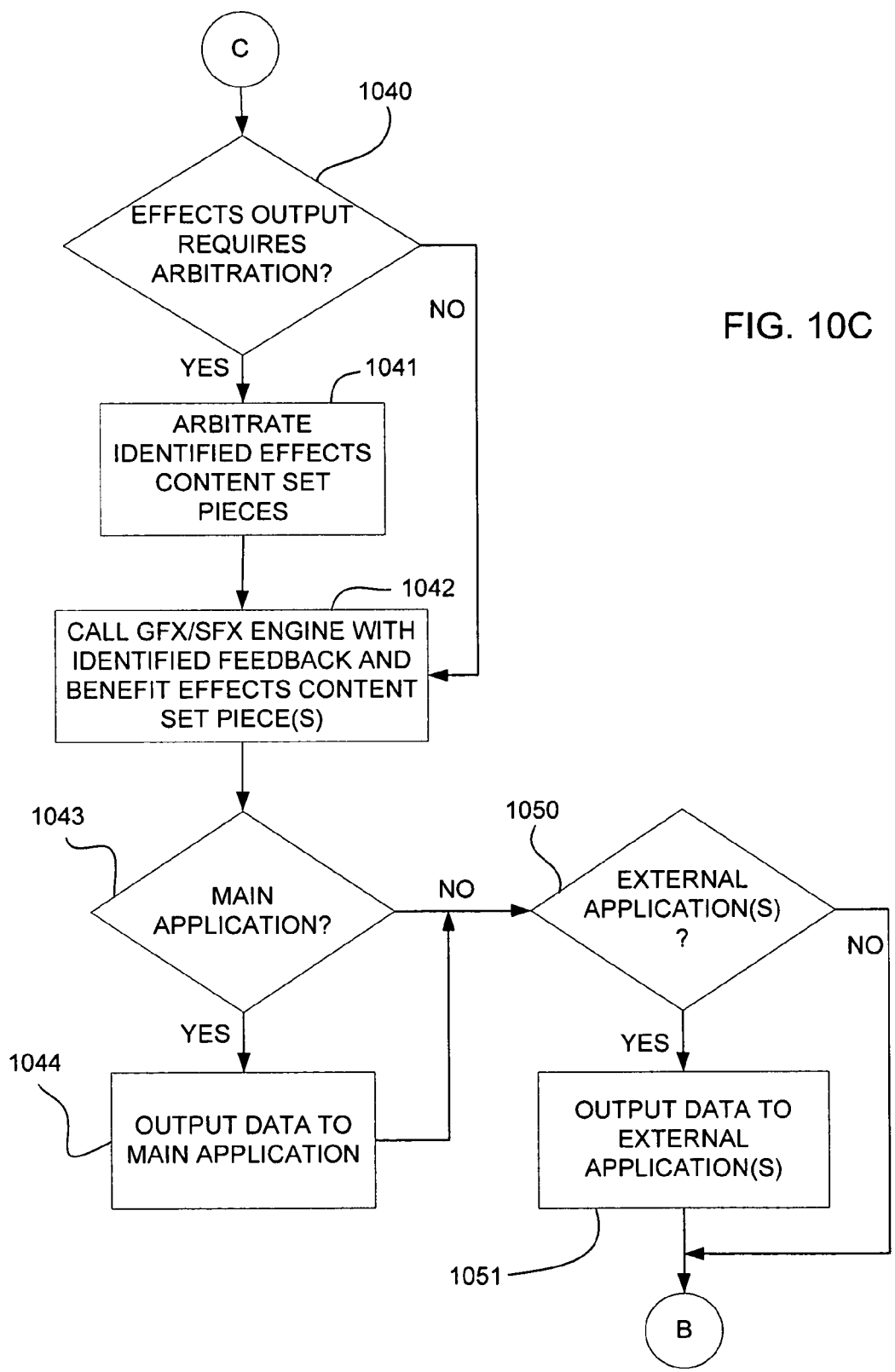

FIGS. 10A, 10B and 10C illustrate an embodiment logic flow for an effects picker methodology. While the following discussion is made with respect to systems portrayed herein, the operations described may be implemented in other systems. Further, the operations described herein are not limited to the order shown. Additionally, in other alternative embodiments more or fewer operations may be performed.

In FIG. 10A an embodiment effects picker makes a determination at decision block 1000 whether the content set for the generator sequence is a rich content set. If yes, for each feedback element of the generator sequence, the effects picker maps the feedback effects content pieces, i.e., files and/or functions, to the points on the respective feedback curve established by the generator engine 1010. The effects picker also maps the sequence benefit effects content pieces, i.e., files and/or functions, to the points on the benefit curve established by the generator engine 1011.

At decision block 1000, if the content set is not a rich content set, i.e., it is a limited content set, the effects picker translates the sequence feedback function, and resultant feedback curve, for each feedback element, established by the generator engine, to a feedback step function 1005. Using the feedback step function, the effects picker, for each feedback element of the generator sequence, maps one or more content pieces, i.e., files and/or functions, to each potential feedback integer value 1006.

The effects picker also translates the sequence benefit function, and resultant benefit curve, established by the generator engine, to a benefit step function 1007. Using the benefit step function, the effects picker maps one or more content pieces, i.e., files and/or functions, to each potential benefit integer value 1008.

At decision block 1012 the effects picker determines if there is a special content set for the generator sequence. If yes, the effects picker maps one or more feedback effects content pieces, i.e., files and/or functions, from the special content set to each established discrete generator sequence point 1013. The effects picker also maps one or more benefit effects content pieces, i.e., files and/or functions, from the special content set to each established discrete generator sequence point 1014.

Referring to FIG. 10B, an embodiment effects picker obtains from the generator engine a current feedback value for each feedback element of the generator sequence for a user's present performance with the generator sequence 1020. The effects picker also obtains from the generator engine a current benefit value for a user's present performance with the generator sequence 1021. An embodiment effects picker can obtain current user input or user movement data from the input handler 1022, and/or the present performance value established by the input handler 1023.

The effects picker uses the current feedback value for a feedback element of the generator sequence to identify the content piece(s) for present feedback effect output to the user 1024. At decision block 1025 a determination is made as to whether there are more feedback elements for the generator sequence. If yes, the effects picker continues to loop, using the current feedback value from the generator engine for each specific feedback element to identify the content piece(s) for present feedback effect output to the user 1024.

If all the feedback elements have had respective content piece(s) identified for output to the user, the effects picker uses the current benefit value from the generator engine to identify the content piece(s) for present benefit effect output to the user 1030.

At decision block 1031 a determination is made as to whether there is a special content set for the generator sequence. If yes, at decision block 1032 the effects picker determines if the user is currently at an identified discrete point in the generator sequence, e.g., the start of the sequence, the end of the sequence, fifty-percent complete with the sequence, etc. In an embodiment, the effects picker uses the current feedback value provided by the generator engine to determine what, if any, discrete point the user is currently at in the generator sequence. In an alternative embodiment, the effects picker uses the current benefit value provided by the generator engine to determine what, if any, discrete point the user is currently at in the generator sequence. In other alternative embodiments, other and/or additional data can be used to determine what, if any, discrete point the user is currently at in the generator sequence.

If the user is currently at an identified discrete point in the generator sequence, the effects picker uses the discrete point position to identify additional, or alternative, feedback effects content piece(s) for output to the user 1033. The effects picker can also use the discrete point position to identify additional, or alternative, benefit effects content piece(s) for output to the user 1034.

Referring to FIG. 10C, at decision block 1040 a determination is made as to whether arbitration is required for the currently identified effects, both feedback and benefit, content piece(s). If it is determined that arbitration would be beneficial, or is necessary, the effects picker arbitrates among the presently identified effects content pieces, determining if one or more should be sequenced, i.e., delayed, or even suppressed 1041.

Whether or not arbitration is used for the presently identified effects, both feedback and benefit, content piece(s), the effects picker then calls, or otherwise accesses or notifies, the GFX/SFX engine 1042. The effects picker also provides, or otherwise makes accessible, to the GFX/SFX engine an identification of the effects content piece(s) to be output to the user 1042. The GFX/SFX engine will access the identified content piece(s) and output the content piece(s) to the user of the generator sequence.

At decision block 1043 an embodiment effects picker makes a determination as to whether a main application of the generator system, e.g., a gaming engine, is using, or in any way accessing, the generator sequence. If yes, the effects picker outputs, or otherwise provides or makes accessible, appropriate data to the main application 1044.

At decision block 1050 an embodiment effects picker makes a determination as to whether there are any other external applications of the generator system e.g., a software renderer, a particle effects generator, etc., that are using, or in any way accessing, the generator sequence. If yes, the effects picker outputs, or otherwise provides or makes accessible, appropriate data to each such external application 1051.

Computer System Configuration

Figure 11:
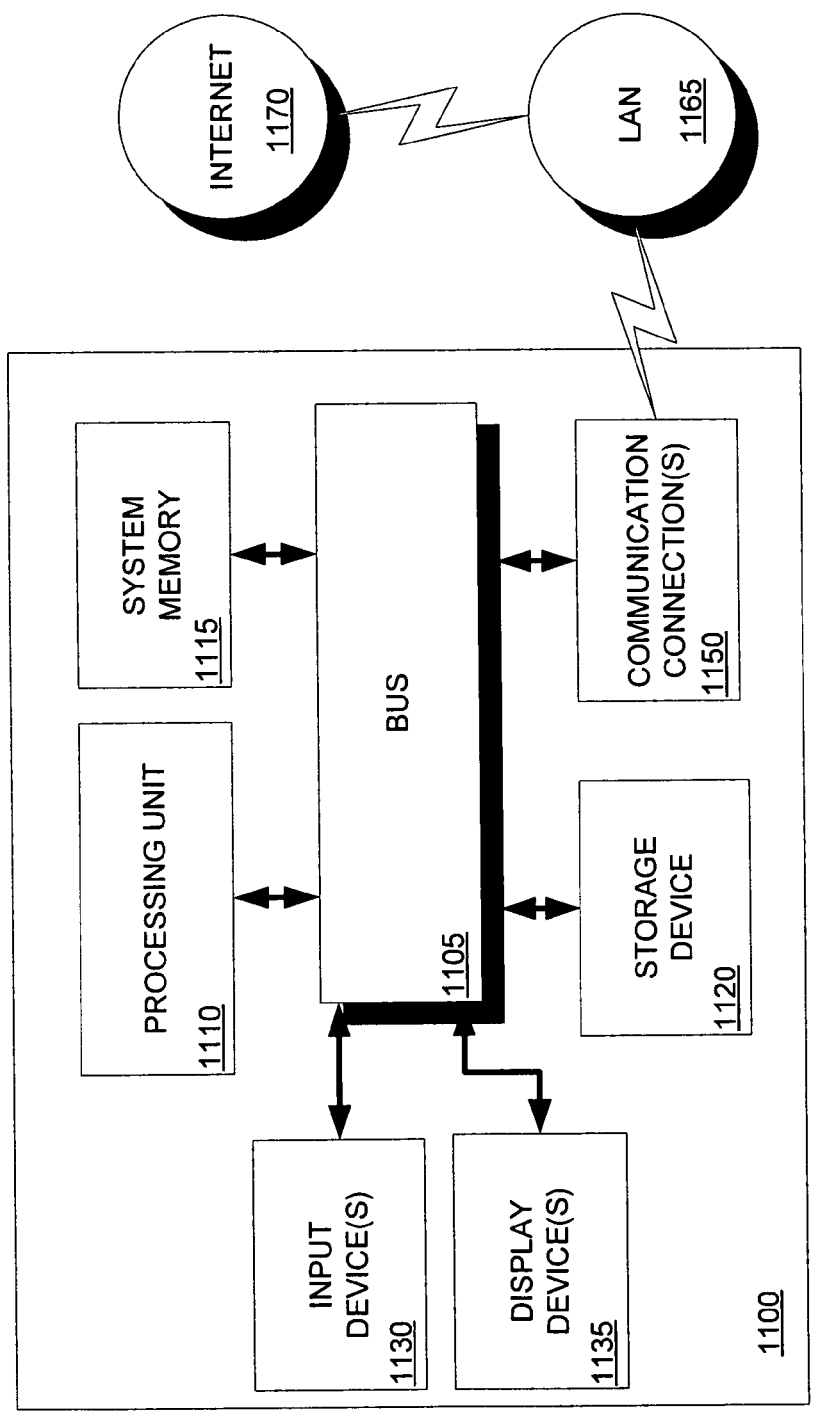
FIG. 11 is a block diagram of an exemplary basic computer system that can process computer software, i.e., program code, or instructions.

FIG. 11 is a block diagram that illustrates an exemplary computer system 1100 upon which an embodiment can be implemented. The computer system 1100 includes a bus 1105 or other mechanism for communicating information, and a processing unit 1110 coupled with the bus 1105 for processing information. The computer system 1100 also includes system memory 1115, which may be volatile or dynamic, such as random access memory (RAM), non-volatile or static, such as read-only memory (ROM) or flash memory, or some combination of the two. The system memory 1115 is coupled to the bus 1105 for storing information and instructions to be executed by the processing unit 1110, and may also be used for storing temporary variables or other intermediate information during the execution of instructions by the processing unit 1110. The system memory 1115 often contains an operating system and one or more programs, and may also include program data.

In an embodiment, a storage device 1120, such as a magnetic or optical disk, is also coupled to the bus 1105 for storing information, including program code comprising instructions and/or data.

The computer system 1100 generally includes one or more display devices 1135, such as, but not limited to, a display screen, e.g., a cathode ray tube (CRT) or liquid crystal display (LCD), a printer, and one or more speakers, for providing information to a computer user. The computer system 1100 also generally includes one or more input devices 1130, such as, but not limited to, a keyboard, mouse, trackball, pen, voice input device(s), and touch input devices, which a computer user can use to communicate information and command selections to the processing unit 1110. All of these devices are known in the art and need not be discussed at length here.

The processing unit 1110 executes one or more sequences of one or more program instructions contained in the system memory 1115. These instructions may be read into the system memory 1115 from another computer-readable medium, including, but not limited to, the storage device 1120. In alternative embodiments, hard-wired circuitry may be used in place of or in combination with software program instructions. Thus, the computer system environment is not limited to any specific combination of hardware circuitry and software.

The term "computer-readable medium" as used herein refers to any medium that can participate in providing program instructions to the processing unit 1110 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punchcards, papertape, or any other physical medium with patterns of holes, memory chip, or cartridge. The system memory 1115 and storage device 1120 of the computer system 1100 are further examples of storage media. Examples of transmission media include, but are not limited to, wired media such as coaxial cable(s) and copper wire, and wireless media such as fiber optic signals, acoustic signals, RF signals and infrared signals.

The computer system 1100 also includes one or more communication connections 1150 coupled to the bus 1105. The communication connection(s) 1150 provide a two-way data communication coupling from the computer system 1100 to other computer systems and/or computing devices on a local area network (LAN) 1165 and/or wide area network (WAN), including the World Wide Web, or Internet 1170. Examples of the communication connection(s) 1150 include, but are not limited to, an integrated services digital network (ISDN) card, modem, LAN card, and any device capable of sending and receiving electrical, electromagnetic, optical, acoustic, RF or infrared signals.

Communications received by the computer system 1100 can include program instructions and program data. The program instructions received by the computer system 1100 may be executed by the processing unit 1110 as they are received, and/or stored in the storage device 1120 or other non-volatile storage for later execution.

Conclusion

While various embodiments are described herein, these embodiments have been presented by way of example only, and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for processing a generator sequence that defines a path from a subset of an application to another subset of the application, the method comprising:
    receiving one or more user inputs from a computer input device;
    using the one or more user inputs to generate a current user performance value;
    generating a difficulty curve from a difficulty function of established expected performance values for points in the path of the generator sequence;
    comparing the generated current user performance value with an expected performance value determined from the difficulty curve at a user's current position in the generator sequence path;
    if the current user performance value does not lie on the difficulty curve, generating a skill function curve from a skill function for the generator sequence, overlaying the skill function curve with the difficulty curve, and establishing a new user position in the generator sequence based on intersection of the current user performance value with the skill function curve;
    generating a feedback curve from a feedback function for the generator sequence, the feedback curve being distinct from the difficulty curve;
    generating a current feedback value based on the established new user position in the generator sequence;
    using the current feedback value to determine one or more content pieces to output to a user of the generator sequence; and
    outputting the one or more content pieces to the user of the generator sequence to guide the user to a goal in using the generator sequence.

2. The method for processing a generator sequence of claim 1, wherein generating the current user performance value includes generating a normalized current user performance value.

3. The method for processing a generator sequence of claim 1, wherein the generator sequence has two or more feedback elements, the method further comprising:
    generating a feedback curve from a feedback function for each feedback element of the generator sequence;
    generating a current feedback value for each feedback element based on the established new user position in the generator sequence;
    using the current feedback value for each feedback element to determine one or more content pieces to output to a user of the generator sequence for each feedback element; and
    outputting the one or more content pieces for each feedback element of the generator sequence to a user of the generator sequence.

4. The method for processing a generator sequence of claim 1, wherein two or more user inputs are aggregated to create a user movement and the user movement is used to generate a current user performance value.

5. The method for processing a generator sequence of claim 1, further comprising:
    generating a benefit curve from a benefit function for the generator sequence;
    generating a current benefit value based on the established new user position in the generator sequence;
    using the current benefit value to determine one or more benefit effects content pieces to output to a user of the generator sequence; and
    outputting the one or more benefit effects content pieces to a user of the generator sequence.

6. The method for processing a generator sequence of claim 5, if two or more content pieces and/or benefit effects content pieces are determined to be output to a user of the generator sequence, further comprising arbitrating between the two or more content pieces and/or benefit effects content pieces determined to be output to a user of the generator sequence, wherein the arbitration results in one or more content pieces and/or benefit effects content pieces determined to be output to a user of the generator sequence being suppressed.

7. The method for processing a generator sequence of claim 1, wherein:
the skill function curve comprises an above-difficulty skill function curve generated from an above-difficulty skill function for the generator sequence if the current user performance value lies above the difficulty curve.

8. The method for processing a generator sequence of claim 1, wherein:
the skill function curve comprises a below-difficulty skill function curve generated from a below-difficulty skill function for the generator sequence if the current user performance value lies below the difficulty curve.

9. The method for processing a generator sequence of claim 1, further comprising translating the feedback function for the generator sequence into a feedback step function for the generator sequence to accommodate a finite number of content pieces for the generator sequence.

10. A generator sequence method for processing user input and providing real-time user output, the method comprising:
defining a generator sequence that defines a path from a subset of an application to another subset of the application using one or more parameter values set by an interaction designer, wherein the generator sequence comprises one or more generator sequence points;
generating an expected performance value for each generator sequence point;
generating a difficulty curve from expected performance values;
receiving one or more user inputs from a computer input device at a user's current generator sequence point;
using the one or more user inputs to generate a normalized current user performance value;
comparing the generated normalized current user performance value with the expected performance value from the difficulty curve for the user's current generator sequence point;
if the normalized current user performance value does not lie on the difficulty curve, generating a skill function curve from a skill function for the generator sequence, overlaying the skill function curve with the difficulty curve, and determining an updated user generator sequence point based on intersection of the normalized current user performance value with the skill function curve;
using the updated user generator sequence point and a feedback curve generated from a feedback function for a feedback element of the generator sequence to determine a feedback value, the feedback curve being distinct from the difficulty curve;
using the feedback value to determine one or more content pieces to output to a user of the generator sequence; and
outputting the one or more content pieces to the user of the generator sequence to guide the user to a goal in using the generator sequence.

11. The generator sequence method of claim 10, wherein two or more user inputs are aggregated to create a user movement and the user movement is used to generate the normalized current user performance value.

12. The generator sequence method of claim 10, further comprising polling one or more user input devices to determine if one or more of the one or more user input devices have user input.

13. The generator sequence method of claim 10, wherein the outputting of the one or more content pieces to the user of the generator sequence is accomplished no later than thirty milliseconds after receiving the one or more user inputs from the user.

14. The generator sequence method of claim 10, wherein:
the skill function curve comprises an above-difficulty skill function curve generated from an above-difficulty skill function for the generator sequence if the normalized current user performance value is above the difficulty curve; and
the skill function curve comprises a below-difficulty skill function curve generated from a below-difficulty skill function for the generator sequence if the normalized current user performance value is below the difficulty curve.

15. The generator sequence method of claim 10, further comprising:
generating a benefit curve from a benefit function for the generator sequence;
generating a current benefit value based on the updated user generator sequence point in the generator sequence; and
outputting one or more benefit effects content pieces to the user of the generator sequence based on the current user benefit value.

16. A method for processing user input and providing user output, the method comprising:
defining a generator sequence comprising one or more generator sequence points, one or more feedback elements, and a sequence benefit;
using a difficulty function for the generator sequence to establish expected performance values for generator sequence points;
generating a difficulty curve of the expected performance values versus the generator sequence points;
inputting one or more user inputs from one or more user input devices while a user is at a first generator sequence point;
establishing a current user performance value from one or more of the one or more user inputs of the user at the first generator sequence point;
comparing the current user performance value with the expected performance value from the difficulty curve at the first generator sequence point;
if the current user performance value does not lie on the difficulty curve, generating a skill function curve from a skill function for the generator sequence, overlaying the skill function curve with the difficulty curve, and determining a second generator sequence point for the user based on intersection of the normalized current user performance value with the skill function curve;
using the second generator sequence point for the user to identify one or more content pieces to output to the user at the second generator sequence point;
outputting the one or more content pieces to the user at the second generator sequence point;
using a feedback function for each feedback element of the generator sequence to establish a feedback curve of feedback values for each feedback element, wherein the feedback curve is distinct from the difficulty curve;
using a sequence benefit function to establish a benefit curve of benefit values for the generator sequence;
determining a user feedback value for a feedback element of the generator sequence for the user at the second generator sequence point;

determining a user benefit value for the user at the second generator sequence point;

using the user feedback value to identify one or more content pieces to provide feedback effects to the user while at the second generator sequence point; and using the user benefit value to identify one or more content pieces to provide sequence benefit effects to the user while at the second generator sequence point.

17. The method of claim 16, wherein the current user performance value is a normalized value.

18. The method of claim 16, further comprising polling the one or more user input devices at a defined rate to determine if one or more of the one or more user input devices have user input.

19. The method of claim 16, wherein the outputting of the one or more content pieces to the user at the second generator sequence point is accomplished no later than thirty milliseconds after the inputting of the one or more user inputs from the one or more user input devices while the user is at the first generator sequence point.

20. The method of claim 16, wherein:

the skill function curve comprises an above-difficulty skill function curve generated from an above-difficulty skill function for the generator sequence if the current user performance value is above the difficulty curve; and the skill function curve comprises a below-difficulty skill function curve generated from a below-difficulty skill function if the current user performance value is below the difficulty curve.

* * * * *